(12) United States Patent
Von Behrens et al.

(10) Patent No.: US 8,127,543 B2
(45) Date of Patent: Mar. 6, 2012

(54) METHODS OF MANUFACTURING HIGHLY INTEGRATED SMA ACTUATORS

(75) Inventors: Peter E. Von Behrens, Chico, CA (US); Dylan M. Fairbanks, Oakland, CA (US)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 1964 days.

(21) Appl. No.: 11/101,849

(22) Filed: Apr. 8, 2005

(65) Prior Publication Data

US 2011/0088387 A1 Apr. 21, 2011

Related U.S. Application Data

(60) Provisional application No. 60/561,072, filed on Apr. 8, 2004.

(51) Int. Cl.
*F01B 29/10* (2006.01)
(52) U.S. Cl. ............................................ 60/527; 60/528
(58) Field of Classification Search .............. 60/527–529
See application file for complete search history.

(56) References Cited

U.S. PATENT DOCUMENTS 348,841 A 9/1886 Hainley
(Continued)

FOREIGN PATENT DOCUMENTS

DE 4209815 9/1993
(Continued)

OTHER PUBLICATIONS

Aircraft Maneuverability, http://www.cs.ualberta.ca/~database/MEMS/smo_mems/flap.html, last modified Aug. 17, 2001, printed Apr. 17, 2003, pp. 1-2.
(Continued)

*Primary Examiner* — Hoang Nguyen
(74) *Attorney, Agent, or Firm* — Dority & Manning, P.A.

(57) ABSTRACT

A shape memory alloy (SMA) actuator assembly is provided that includes an SMA component. The SMA component is used to impart motion in an output shaft. Also provided is a return force component that provides a variable, tailored return force to the SMA component. Additionally, a variety of protective mechanisms are disclosed and utilized to prevent damage to the internal workings and components within the SMA actuator assembly as well as provide protection and safety for external workings.

27 Claims, 21 Drawing Sheets

U.S. PATENT DOCUMENTS

| | | | |
|---|---|---|---|
| 1,658,669 | A | 2/1928 | Cohn et al. |
| 2,518,941 | A | 8/1950 | Satchwell et al. |
| 2,975,307 | A | 3/1961 | Schroeder et al. |
| 3,452,175 | A | 6/1969 | Wilkes |
| 3,452,309 | A | 6/1969 | Wilkes |
| 3,641,296 | A | 2/1972 | Schwarz |
| 3,725,835 | A | 4/1973 | Hopkins et al. |
| 3,940,935 | A | 3/1976 | Richardson et al. |
| 4,027,953 | A | 6/1977 | Jacob |
| 4,150,544 | A | 4/1979 | Pachter |
| 4,559,512 | A * | 12/1985 | Yaeger et al. ............ 337/140 |
| 4,579,006 | A | 4/1986 | Hosoda et al. |
| 4,586,335 | A | 5/1986 | Hosoda et al. |
| 4,626,085 | A | 12/1986 | Suzuki |
| 4,742,680 | A | 5/1988 | Mecca |
| 4,751,821 | A | 6/1988 | Birchard |
| 4,806,815 | A | 2/1989 | Honma |
| 4,811,564 | A | 3/1989 | Palmer |
| 4,829,767 | A | 5/1989 | Mecca |
| 4,841,730 | A | 6/1989 | McDonald |
| 4,884,557 | A | 12/1989 | Takehana et al. |
| 4,932,210 | A | 6/1990 | Julien et al. |
| 4,977,886 | A | 12/1990 | Takehana et al. |
| 5,014,520 | A | 5/1991 | Orner et al. |
| 5,092,781 | A | 3/1992 | Casciotti et al. |
| 5,127,228 | A | 7/1992 | Swenson |
| 5,129,753 | A | 7/1992 | Wesley et al. |
| 5,165,897 | A | 11/1992 | Johnson |
| 5,166,832 | A | 11/1992 | Zychowicz |
| 5,172,551 | A | 12/1992 | Nakajima et al. |
| 5,235,225 | A | 8/1993 | Colgate et al. |
| 5,312,152 | A | 5/1994 | Woebkenberg, Jr. et al. |
| 5,344,506 | A | 9/1994 | DeAngelis |
| 5,556,370 | A | 9/1996 | Maynard |
| 5,563,466 | A | 10/1996 | Rennex et al. |
| 5,618,066 | A | 4/1997 | Fu-Hsiang |
| 5,685,148 | A | 11/1997 | Robert |
| 5,747,993 | A | 5/1998 | Jacobsen et al. |
| 5,763,979 | A | 6/1998 | Mukherjee et al. |
| 5,770,913 | A | 6/1998 | Mizzi |
| 5,771,742 | A | 6/1998 | Bokaie et al. |
| 5,829,253 | A | 11/1998 | Long et al. |
| 5,901,554 | A | 5/1999 | Greschik |
| 5,917,260 | A | 6/1999 | Garcia et al. |
| 6,019,113 | A | 2/2000 | Allston et al. |
| 6,069,420 | A | 5/2000 | Mizzi et al. |
| 6,126,115 | A | 10/2000 | Carrier et al. |
| 6,164,784 | A | 12/2000 | Butura et al. |
| 6,218,762 | B1 | 4/2001 | Hill et al. |
| 6,326,707 | B1 * | 12/2001 | Gummin et al. ........... 310/12.15 |
| 6,327,855 | B1 | 12/2001 | Hill et al. |
| 6,333,583 | B1 | 12/2001 | Mahadevan et al. |
| 6,364,496 | B1 | 4/2002 | Boddy et al. |
| 6,374,608 | B1 | 4/2002 | Corris et al. |
| 6,404,098 | B1 | 6/2002 | Kayama et al. |
| 6,434,333 | B2 | 8/2002 | Tanaka et al. |
| 6,450,064 | B1 * | 9/2002 | Christiansen et al. ....... 74/572.2 |
| 6,574,958 | B1 * | 6/2003 | MacGregor .................. 60/527 |
| 7,017,345 | B2 * | 3/2006 | Von Behrens et al. ......... 60/527 |
| 7,256,518 | B2 * | 8/2007 | Gummin et al. ........... 310/12.33 |
| 7,555,900 | B1 * | 7/2009 | Vallance et al. ............... 60/528 |

FOREIGN PATENT DOCUMENTS

| | | |
|---|---|---|
| DE | 19509177 | 9/1996 |
| EP | 0147491 | 7/1985 |
| FR | 7709117 | 10/1978 |
| FR | 2730766 | 8/1996 |
| GB | 2093589 | 9/1982 |
| GB | 2334046 | 8/1999 |
| JP | 07 274561 | 10/1995 |
| KR | 9605617 | 4/1996 |
| KR | 9607599 | 6/1996 |
| WO | WO 98/08355 | 2/1998 |
| WO | WO 01/12985 | 2/2001 |

OTHER PUBLICATIONS

Bokaie, Latch-Release Pin Puller with Shape-Memory Alloy Actuator, Lewis Research Center, http://www.nasatech.com/Briefs/Feb98/LEWI6511.html, printed Apr. 17, 2003.

Bone Plates, http://www.cs.ualberta.ca/~database/MEMS/sma_mems/bone.html, last modified Aug. 17, 2001, printed Apr. 17, 2003, pp. 1-2.

Glossary: Shape Memory Effect, http://www.cs.ualberts.ca/~database/MEMS/sma_mems/glossary.cgi, last modified Aug. 17, 2001, printed Apr. 17, 2003, pp. 1-2.

Grant et al., "Variable Structure Control of Shape Memory Alloy Actuators," IEEE Control Systems 17(3):80-88, 1997.

Hashimoto et al., "Application of Shape Memory Alloy to Robotic Actuators," J. Robotic Systems 2(1):3-25, 1985.

Hirose et al., "A New Design of Servo-Actuators Based on the Shape Memory Effect," Theory and Practice of Robots and Manipulators, 339-349, 1984.

Hodgson et al., Shape Memory Alloys, http://www.sma-inc.com/SMAPaper.html, 1999, printed Apr. 17, 2003.

Ikuta et al., "Mathematical model and experimental verification . . . ," IEEE Robotics and Automation 4:103-108, 1991.

Ikuta et al., "Shape Memory Alloy Servo Actuator System with Electric Resistance Feedback and Application for Active Endoscope," Proc. IEEE Int. Conf. on Robotics and Information, 427-430, 1988.

Ikuta, "Micro/Miniature Shape Memory Allow Actuator," IEEE Robotics and Automation 3:2156-2161, 1990.

Kuribayashi, "A New Actuator of a Joint Mechanism Using TiNi Alloy Wire," Int. J. Robotics 4(4):47-58, 1986.

Mills JW, "Lukasiewicz' Insect: The Role of Continuous-Valued Logic in a Mobile Robot's Sensors, Control, and Locomotion," in Siquito: Advanced Expriments with a Simple and Inexpensive Robot Chapter 12, pp. 197-211, IEEE Computer Society Press, Los Alamitos, CA USA ISBN 0-8186-7408-3, 1993.

Otsuka et al., "Shape Memory Materials," pp. 36-48, Cambridge University Press, Cambridge, England, 1998, ISBN 0-521-44487X.

Rediniotis et al., "Development of a Shape-Memory-Alloy Actuated Biomimetic Hydrofoi," Journal of Intelligent Material Systems and Structures, 13:35-49, 2002.

Robotic Muscles, http://www.cs.ualberta.ca/~database/MEMS/sma_mems/muscle.html, modified Aug. 17, 2001, printed Apr. 17, 2003, pp. 1-2.

Shape Memory Alloys, http://www.cs.ualberta.ca/~database/MEMS/sma_mems/sma.html, last modified Aug. 17, 2001, printed Apr. 17, 2003, pp. 1-4.

Smith et al., "Development of Shape Memory Alloy (SMA) Actuated Mechanisms for Spacecraft Release Applications", SSC99-XI-7, 13_AIAA/USU Conference on Small Satellites.

Technical Characteristics of FLEXINOL™ Actuator Wires, Dynalloy, Inc., Printed on Feb. 26, 2001.

WPPI Database XP002202662, "Shape Memory Metal Actuator Control Device—Has Minimum and Maximum Detector to Monitor State of Actuator Based on its Minimum and Maximum Allowable Impedance," Oct. 20, 1995.

* cited by examiner

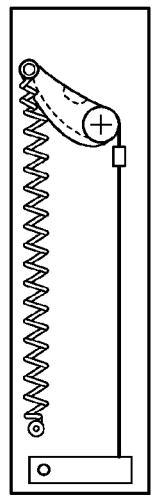
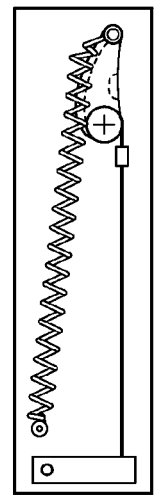
FIG. 12(a)  FIG. 12(b)
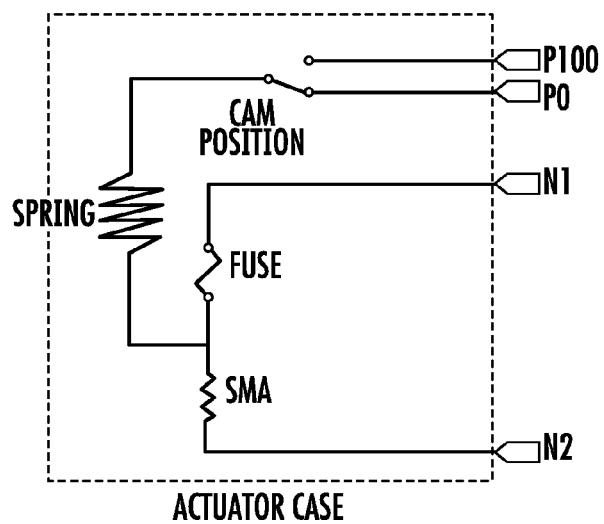
FIG. 13

INSERT MOLDED INTERFACE

CRIMPED END

RETURN SPRING ANCHOR

LEAF SPRING CONTACT (P100)

SMA CRIMPS

THERMAL FUSE CONTACT

METHODS OF MANUFACTURING HIGHLY INTEGRATED SMA ACTUATORS

CROSS REFERENCE TO RELATED APPLICATIONS

This application claims priority under 35 U.S.C. §120 to U.S. patent application Ser. No. 10/431,173, filed May 6, 2003, which claims benefit under 35 U.S.C. 119(e) of U.S. Provisional Patent Ser. No. 60/378,445, filed May 6, 2002, and also claims benefit under 35 U.S.C. §119(e) of U.S. Provisional Patent Application Ser. No. 60/561,072, filed Apr. 8, 2004. The above applications are all incorporated herein by reference in their entirety.

FIELD OF INVENTION

The present invention relates to actuator assemblies, and more particularly to actuator assemblies that employ shape memory alloy materials and integrated protective mechanisms, as well as manufacturing techniques and resulting structures.

BACKGROUND OF INVENTION

The thermoelastic properties of shape memory alloys (SMA) have been known since the 1930s. Experimental use of SMAs continued for decades. Commercially viable uses for SMAs remained elusive until the 1990s. Today, SMA materials are finding unique applications in a variety of industries from the automobile industry to the medical industry. One application is the use of SMA materials for actuators.

While SMA actuators have been attempted, existing SMA actuators suffer from a number of shortcomings. For example, many existing SMA actuators have insufficient protective mechanisms to ensure safe, reliable and extended lifetime operation of the SMA materials employed in the actuator. Because of the special properties of the SMA materials currently used, there is a need to prevent excessive force, or excessive electrical power from being applied to the SMA element for extended periods. For example, SMA materials are commonly used in wire form typically with small diameter wires. The advantageous austenitic contraction of an SMA material is quite large even in a small diameter wire. However, while SMA wires typically have high material strength they have low ultimate tensile strength. As such, particular care should be taken in designs using SMA wires. SMA wire failure may result in catastrophic failure of the overall actuator. There is a need, therefore, for improved SMA-based actuators that overcome the shortcomings of the existing SMA actuators.

SUMMARY OF THE INVENTION

An SMA actuator assembly is provided. The SMA actuator assembly includes a SMA component coupled to an output shaft such that SMA actuation results in output shaft movement. Additionally, a return force component is coupled to the SMA component to move the SMA component from a contracted configuration to an extended configuration. In some instances, the return force component imparts a non-linear return force to the SMA component. Additionally, the SMA actuator assembly includes a protective mechanism to prevent SMA component damage.

BRIEF DESCRIPTION OF THE DRAWINGS

Other advantages of the present invention will be readily appreciated by referring to the following detail description in conjunction with the accompanying drawings wherein:

FIGS. 12A and 12B illustrate a spring for an actuator and profile for an actuator.

FIG. 13 illustrates an actuator electrical schematic.

DETAILED DESCRIPTION

Figure 1A:
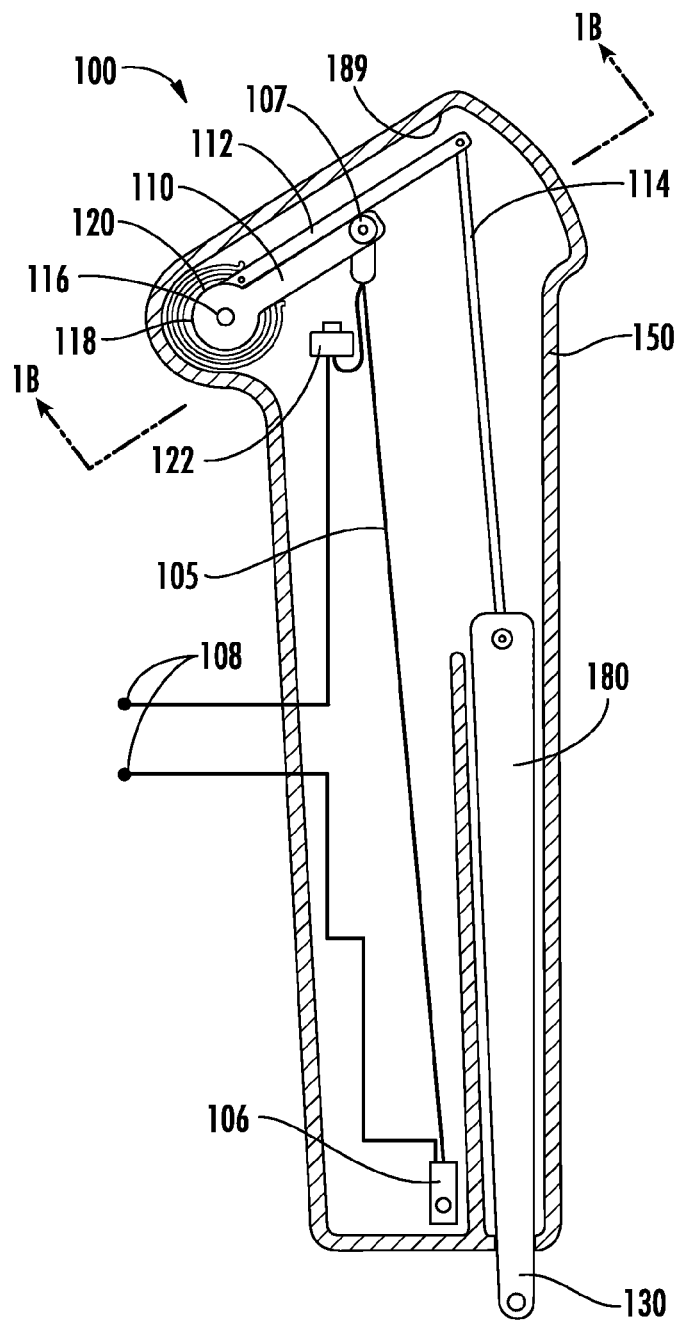
FIG. 1A is a top-down view of an embodiment of an SMA actuator assembly of the present invention having a linear output.

FIG. 1A is a top-down view of an embodiment of an SMA actuator assembly 100 according to the present invention. The SMA actuator assembly 100 includes an SMA component 105, a drive member 110, an output member 112, a linkage 114, and an output shaft 180 disposed inside of a protective casing 150. In this embodiment of the SMA actuator assembly 100, the SMA component 105 is an SMA wire. The SMA wire 105 is suitably attached within the casing 150 at attachment point 106 and to drive member 110 at attachment point 107. Terminal connectors 108 provide activation energy (i.e., electrical current) to the SMA wire 105. A protective mechanism, here a limit switch 122, is connected in-line with the power supplied to the SMA wire 105. The operation of the limit switch 122 is described below.

The particular arrangement of the drive member 110 and the output member 112 will now be described through reference to FIG. 1A in conjunction with FIG. 1B. The drive member 110 is attached to the SMA component 105 at the attachment point 107. The output member 112 is attached to the linkage 114, which is in turn attached to the output shaft 180. External loads may be attached to the output shaft 180 at external attachment point 130.

The drive member 110 and the output member 112 are in a split-lever configuration and are free to move relative to one another about the pivot point 116. The drive member 110 and the output member 112 are held in a fixed position by a resilient coupling element 120. In the embodiment of the SMA actuator assembly illustrated in FIG. 1A, the resilient coupling element 120 is a spring clip. The spring clip 120 is shaped, sized and dimensioned to provide a rigid coupling force between the drive member 110 and the output member 112 while the drive forces exerted on the drive member 110 and the output member 112 remain within design limitations. If the forces exerted on either drive member 110 or output member 112 exceed the specified design ranges, then the spring clip 120 will deflect from the illustrated rigid position into a deflected position, thereby absorbing the excessive force and preventing damage to other components within SMA actuator assembly 100, and especially preventing damage to the SMA wire 105. In this manner, the spring clip 120 acts as a protective mechanism, specifically, the spring clip 120 acts as an overstress protection mechanism.

Figure 1B:
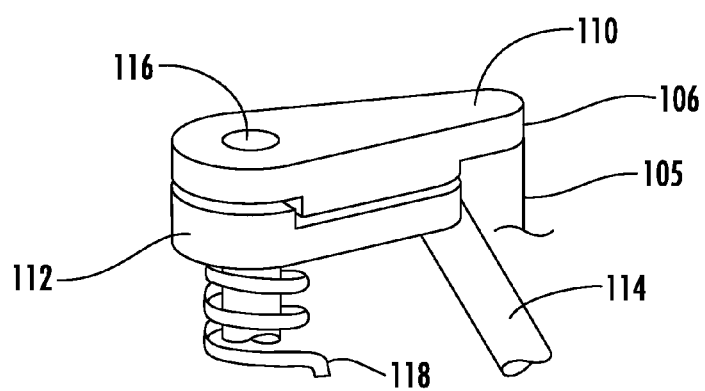
FIG. 1B is a sideview of the split lever members of FIG. 1A taken along line 1B-1B of FIG. 1A.

Turning now to FIG. 1B, the operation of the return force component 118 can be better appreciated. FIG. 1B is an enlarged portion of FIG. 1A illustrating only the pivot point 116, the drive member 110, the output member 112, the return force component 118, the linkage 114 and the SMA wire 105. For purposes of clarity, clip spring 120 has been omitted from FIG. 1B. In this embodiment, the return force component 118 is a torsion spring suitably attached within the casing 150 and to the output member 112. Thus, when the SMA wire 105 is actuated, the torsion spring 118 is placed under load. In the illustrated configuration, SMA actuation causes the torsion spring 118 to twist (i.e., generate and store the return force energy). Once power is removed from the SMA wire 105, the return force energy stored in the torsion spring 118 is released and the twisting motion of the torsion spring 118 returns the elements of the SMA actuator assembly 100 to their extended configuration positions (FIG. 1A).

The operation of the SMA actuator assembly 100 will now be described. The SMA wire 105 is illustrated in an extended position in FIG. 1A. As used herein, the term "extended configuration" for an SMA component indicates that the SMA material used in that SMA component is in a martensite phase and elongated. In contrast, a "contracted configuration" for an SMA component indicates that the SMA material in that SMA component is in the austenite phase and shortened. When power is provided via terminal connections 108 to SMA wire 105, SMA wire 105 will undergo a thermoelastic contraction. As used herein, "a thermoelastic contraction" refers to the application of sufficient energy to an SMA element for that element to undergo a martensite to austenite phase change. Because connection point 106 is fixed to the frame 150, contraction of the SMA wire 105 results in the movement of drive member 110 towards connection point 106. Because drive member 110 and output member 112 are resiliently coupled by the spring clip 120, the movement of drive member 110 is transmitted, in turn, to the output member 112, the linkage 114, and results in the linear movement of the output shaft 180 (i.e., the external connection point 130 moves away from casing 150). The contraction movement of SMA wire 105 ends when drive member 110 contacts the limit switch 122.

When drive member 110 contacts limit switch 122, electrical power from terminal 108 is interrupted. Once power is no longer applied to SMA wire 105, the return force energy stored in the return force component (i.e., the torsion spring 118) reverses the above described movements and returns the SMA actuator assembly elements to their original, extended positions as described above and illustrated in FIG. 1A.

As described above the SMA actuator assembly 100 includes several protective mechanisms. The spring clip 120 acts as a protective mechanism in that when an external force is applied to the SMA actuator assembly 100 (i.e., a force is exerted at attachment point 130 pushing in the output linkage 180), the subsequent deflection of output member 112 relative to drive member 110 is absorbed by spring clip 120, thereby preventing damage to SMA wire 105. In this regard, spring clip 120 acts as an overstress protection of SMA wire 105. Additionally, it is to be appreciated that the relative spacing of the output member 112 relative to the casing 150 is such that the output member will contact the casing at approximately point 189. The resulting contact between the output member 112 and the casing 150 is also a form of overstress protection.

Another protective mechanism is limit switch 122. The limit switch 122 may operate as an overcurrent protection switch for the SMA component 105 as indicated above. When used for this purpose, the limit switch 122 is positioned relative to the drive member 110 when the SMA component 105 is in its designed contraction configuration.

The designed contraction configuration for a given SMA component is used to limit the contraction forces generated within an SMA component as it undergoes austenite transition. Application of excessive thermal energy to an SMA after the SMA component has reached the designed contracted state could result in catastrophic SMA component failure or decrease the operational service life of the SMA component. Limit switch 122 is therefore positioned relative to the output member 110 so that power to the SMA wire 105 is shut off when the SMA wire 105 has deflected the output member 110 to the position that indicates the SMA wire 105 has reached designed contraction configuration.

Limit switch 122 can also be used as an overstress mechanism. In this regard, the limit switch 122 can be positioned relative to the drive member 110 to indicate the limit of the range of motion of the mechanical linkages within the SMA actuator assembly 100. As illustrated in FIG. 1A, the limit switch 122 is positioned so as to prevent the transmission of excessive contraction forces from the SMA component 105 into the linkages of the SMA actuator assembly 100. As such, when drive member 110 reaches a defined limit of motion it will contact limit switch 122, which in turn will cut power to SMA wire 105 and stop the generation of further contraction forces. In this way, the limit switch 122 may be used as an overstress protection feature for the linkages of the SMA actuator assembly 100. While limit switch 122 has been indicated in relative position to drive member 110, it is to be appreciated that limit switch 122 can be positioned in relative proximity to any of the components of the SMA actuator assembly 100 whereby the limit switch provides the protective features described above or to otherwise stop the application of power to SMA wire 105 as desired.

It is to be appreciated that the protective mechanisms described above may be cooperatively employed to prevent damage to the SMA wire 105. As discussed above, one major limitation of SMA components is low mechanical strength. The SMA wire 105 may generate larger internal forces than can be maintained over its designed operating life. Embodiments of the SMA actuator assembly 100 of the present invention provide protective mechanisms for the extended and contracted configurations of the SMA component 105 as well throughout the stroke of the SMA component 105. An externally generated force applied to the output shaft 180 (i.e., moving the connection point 130 away from the casing 150) would tend to move the SMA component 105 into an over extended configuration. The protective feature that prevents this sort of damage is the spring clip 120. In the contracted position, the limit switch 122 prevents excessive power from being applied to the SMA component so that the contraction forces generated by the SMA component 105 remain within a designed range of motion when undergoing austenite contraction. In another alternative embodiment, the spring and switch can also be combined and placed at attachment point 106. In this configuration, when an external force causes excessive force on the SMA component 105, the spring/switch mechanism at attachment point 106 deflects, opening the switch and shutting off electrical power. As such, the integrated spring/switch element provides mechanical overstress protection and electrical cut-off in a single element.

Figure 2:
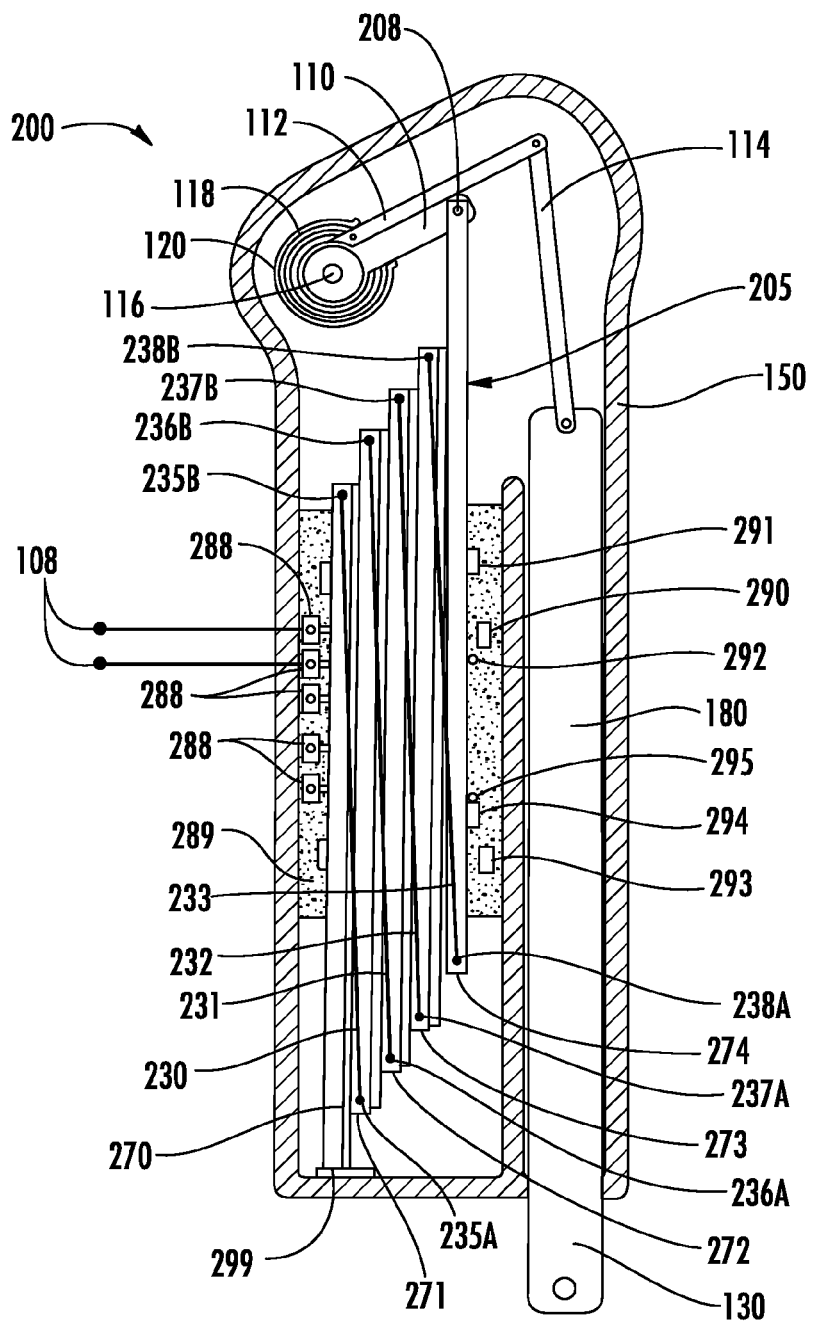
FIG. 2 is a top-down view of an alternative embodiment of a SMA actuator assembly according to the present invention having a linear output.

FIG. 2 is a top-down view of an alternative embodiment of an SMA actuator assembly 200 according to the present invention. The same reference numbers have been used to designate similar components. The SMA component 205 interacts with the drive member 110, the output member 112, the linkage 114, the output shaft 180, the spring clip 120 and the torsion spring 118 as described above with regard to the SMA component 105 of SMA actuator assembly 100 (FIGS. 1A and 1B). The spring clip 120 acts as a protective mechanism in the SMA actuator assembly 200 by providing overstress protection of the SMA component 205 in a manner similar to the overstress protection provided the SMA component 105.

One unique aspect of the SMA actuator assembly 200 is the SMA actuator component 205. The SMA component 205 comprises a set of stacked, parallel conductive plates having SMA wire connecting adjacent plates inside of the casing 150. These plates are stacked into a parallel array, with plate 270 being the lowest and attached to the casing 150 at attachment point 299. The plate 270 is then followed in succession by plates 271 through 273, and topped by plate 274. The top plate 274 is attached to the drive member 110 at attachment point 208. Each plate is made of a material that is rigid yet soft enough to permit crimping of the material onto the SMA wires 230 through 233 at crimp joints 235A and 235B through 238A and 238B, respectively. A suitable material for the plates is, for example, a half-hard cartridge brass or a half-hard nickel-silver.

Other methods of attachment of the wires may be used, but crimping is an attractive method for ease, economy, and not increasing the size of the assembled actuator. Other aspects, details and embodiments of the parallel plate, SMA component 205 can be found in co-pending U.S. patent application Ser. No. 09/637,713 entitled "Shape Memory Actuators and Control Methods" filed Aug. 11, 2000, and incorporated herein by reference in its entirety.

Another unique aspect of the SMA actuator assembly 200 is the printed circuit board 289. The printed circuit board 289 provides easy connection points for power and other control elements via pad connectors 288. Additionally, printed circuit board 289 includes a number of protective features. As illustrated in FIG. 2, printed circuit board 289 provides two protective features, the overpower limit switch 290 and the SMA extension limit switch 293. The overpower limit switch 290 is integrated into the printed circuit board 289 and is electrically connected in a normally closed condition between the power terminals 108 and the overpower limit switch contact pin 292. The top plate 274 is provided with a feature 291 with a conductive face. When electrical power is applied to the SMA component 205, the SMA wires 230 through 233 contract causing relative movement of the plates 270 through 274. As a result, the feature 291 on top plate 274 moves in a direction towards the output shaft connection point 130. When the top plate 274 reaches a point designating the desired contraction configuration for the SMA component 205, the feature 291 electrically contacts overpower limit switch contact pin 292 opening the normally closed overpower limit switch 290. When overpower limit switch 290 is open, power is shut off to the SMA component 205. As a result, the overpower limit switch 290 protects the SMA wires or links within the SMA component 205 by preventing the extended application of electrical power. By preventing the extended application of electrical power, the overpower limit switch 290 also helps prevent excessive heat generation thereby lowering the risk of fire.

As described above, the overpower limit switch 290 acts to protect the SMA component 205 in a contracted configuration. The SMA actuator assembly 200 also includes protective mechanisms that operate to prevent damage to the elements of the SMA actuator assembly 200 when in an extended configuration. One such mechanism is the SMA extension position limit switch 293. The SMA extension position limit switch 293 is integrated into the printed circuit board 289. An extension position feature 294 is present on the output plate 274. An extension position limit switch contact pin 295 is present on the printed circuit board 289. The relative positions of the extension position feature 294 and the extension position limit switch contact pin 295 is determined by the extension configuration of a given SMA component 205. As such, when the SMA component 205 has been returned to its designed extended configuration, the top plate 274 is positioned such that extension position feature 294 makes electrical contact with the extension position limit switch contact pin 295. This electrical contact closes the normally open extension limit switch 293. For example, the SMA component 205 illustrated in FIG. 2 is in an extended configuration meaning that the SMA extension position feature 294 on plate 274 is in contact with extension position limit switch contact pin 295 and the SMA extension limit switch 293 is open. The "closed" condition of the extension limit switch 293 may then be used, for example, to indicate that the SMA component has been returned to the correct extension position. Additionally, the "closed" condition could be used to generate, though appropriate control systems, a "stop" signal to another component cooperatively operating with the SMA actuator assembly 200 by, for example, applying an external force to the output shaft 180 via the connection point 130.

The operation of the SMA actuator assembly 200 of FIG. 2 will now be described. The SMA component 205 is illustrated in an extended configuration. Extended configuration means that each of the SMA links 230 through 233 are in an extended position. Electrical power is provided via terminals 108 into the SMA component 205. Because the SMA component is suitably fixed to casing 150 at attachment point 299, the contraction forces generated by the contraction of the SMA wires 233 and the relative sliding motion of the plates 270 through 274 are transmitted to the drive member 110. The contraction forces generated by SMA component 205 result in the movement of drive member 110 towards the attachment point 299. Because the drive member 110 and output member 112 are resiliently coupled together by spring clip 120, the force is transmitted to linkage 114 and thence to output shaft 180. Additionally, return force energy is stored in the torsion spring 118 as described above (FIGS. 1A and 1B). As a result of the SMA wire contraction and plate movement, the top plate 274 overpower limit feature 291 moves in a direction towards the overpower limit switch contact pin 292. As the SMA component 205 reaches its designed contracted configuration, the overpower limit feature 291 will contact the overpower limit switch contact pin 292 opening overpower limit switch 290. When overpower limit switch 293 is open, electrical power provided to the SMA wires 230 through 233 is shut off. Once power to the SMA component 205 has been shut off, the return energy stored in torsion spring 118 acts to reverse the linkage movement caused by the contraction of the SMA component 205. The force applied by torsion spring 118 to the drive member 110 and output member 112 results in the movement of the output shaft 180 as well as the SMA component top plate 274 to return to the extended configuration.

Figure 3:
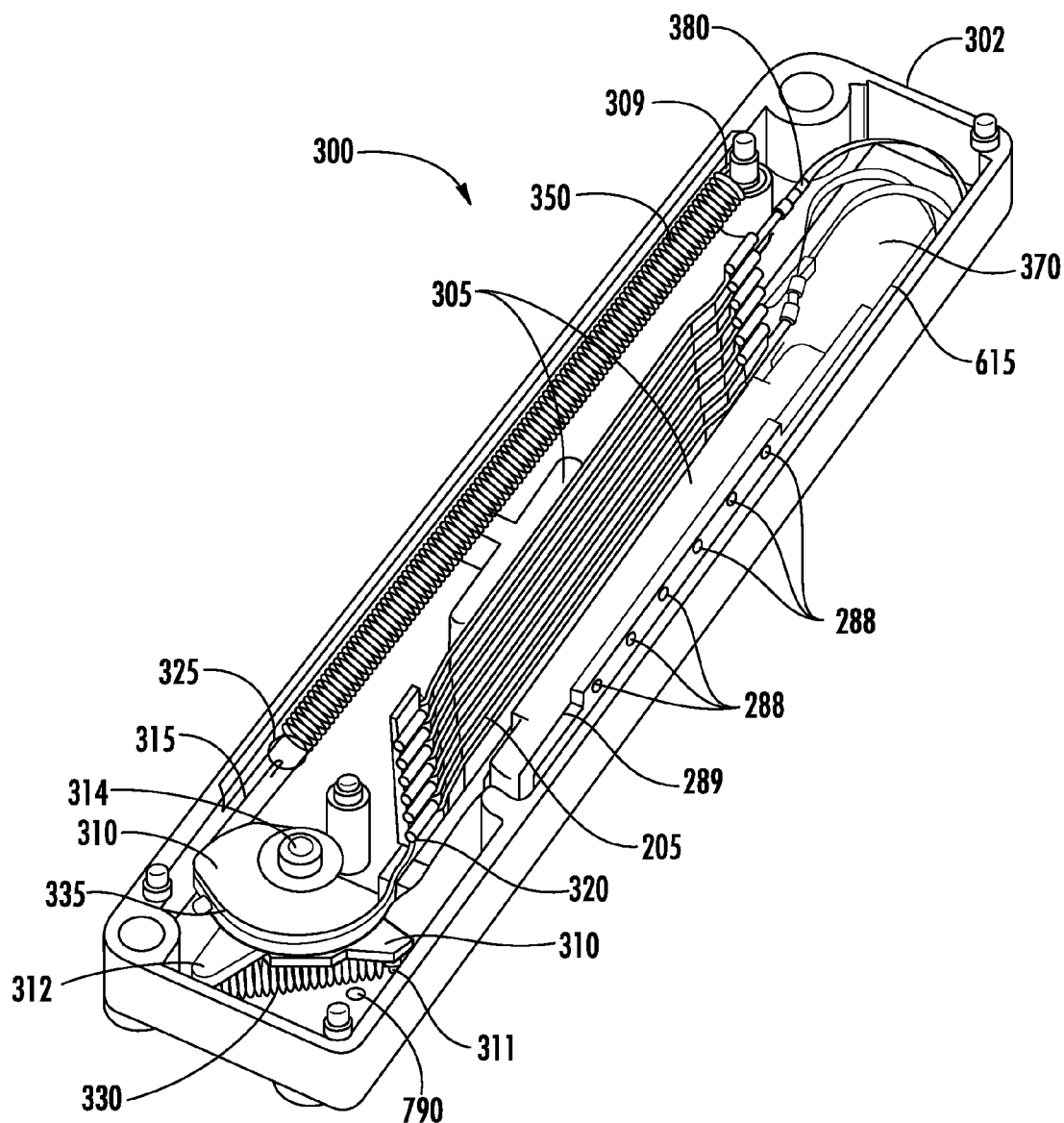
FIG. 3 is a top-down view of an alternative embodiment of an SMA actuator assembly according to the present invention having a rotary output.

FIG. 3 is a top down view of another alternative embodiment of a shape memory alloy actuator assembly according to the present invention. The shape memory alloy actuator assembly 300 is illustrated with a shape memory alloy component 205 that has been described above with reference to FIG. 2. Similarly, the shape memory alloy component 205 is electrically connected to a printed circuit board 289 that includes a plurality of connection points 288 for applying power control signals and other electrical connections to the shaped memory alloy component 205. While not visible in this view of the shape memory alloy actuator assembly 300, the printed circuit board 289 includes the protective features described above with reference to FIG. 2. In addition, the resilient coupling and overstress protection functions provided by spring clip 120 are similarly provided by the resilient coupling element 330. Also functionally similar to the shape memory alloy actuator assembly 200 of FIG. 2, the return force element 350 provides a similar return force energy storage and release function as the torsion spring 118 (FIG. 2).

The SMA component 205 is attached to the shape memory alloy actuator assembly casing 302 via connection points 305. Other components of the shape memory alloy actuator assembly 300 include an output shaft 314, a drive member 310 having a tailored return force profile adjustment surface 335, an output member 312, a flexible linkage 315, and an over-temperature protection mechanism 370. The return force component 350 is attached to the casing 302 at attachment point 309 and to the flexible linkage 315 at attachment point 325. The return force component 350 in this embodiment is a spring. The flexible linkage 315 is coupled to the return force component 350 across the tailored return force profile adjustment surface 335 of the drive member 310 and is then connected to the shape memory alloy component 205 at connection point 320.

Figure 4:
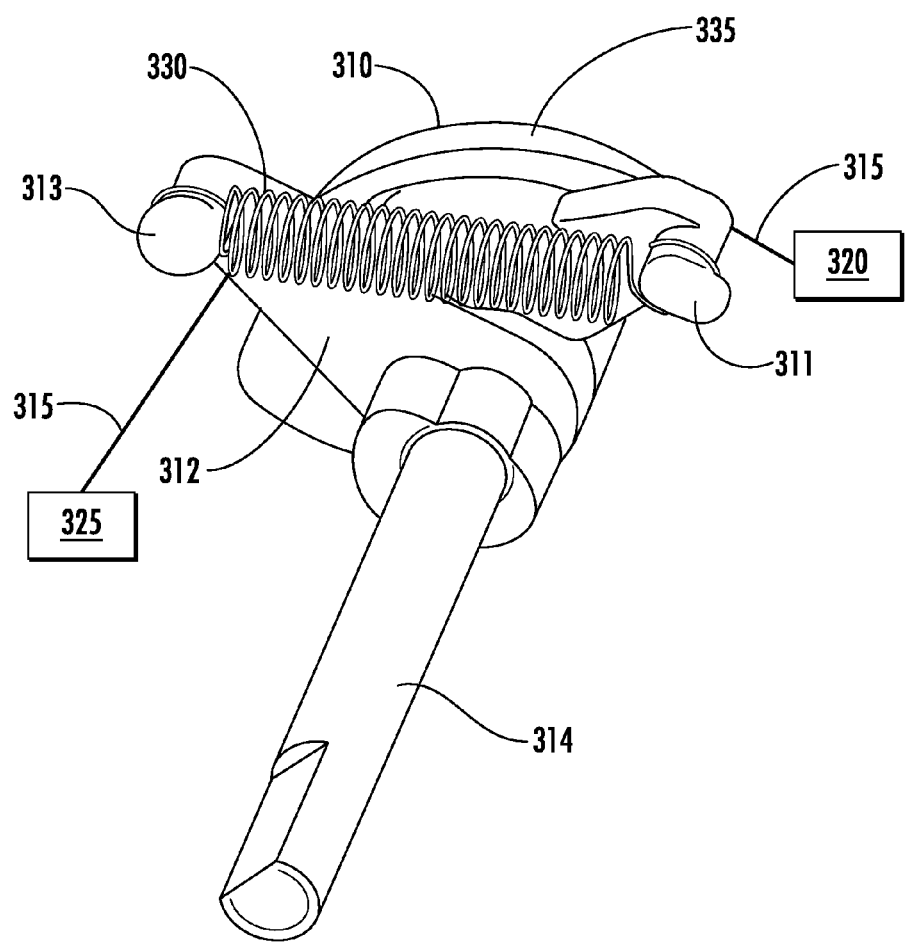
FIG. 4 is a bottom-up view of the output shaft of the embodiment of the SMA assembly of FIG. 3.

The cooperative operation of the output shaft 314, drive member 310 and output member 312 will now be described with reference to FIG. 3 and FIG. 4. FIG. 4 illustrates a bottom-up view of the above listed elements as they are arranged in FIG. 3. A resilient coupling component 330 is attached between the drive member 310 and the output member 312 via the attachment points 311 and 313 respectively. The output member 312 is fixedly attached to the output shaft 314. The drive member 310 is in a rotatable relation to the output shaft 314 meaning that the output shaft 314 is free to rotate within the drive member 310. When power is applied to the shape memory alloy component 205 and the SMA wires within the shape memory alloy component 205 contract, the contraction force is imparted to the flexible linkage 315 and in turn to the drive member 310. Since drive member 310 is resiliently coupled to output member 312 by resilient coupling component 330, drive member 310 movement results in movement of the output member 312 and the output shaft 314. The same motion results in the extension of the return force component 350 and the storage of the return force energy. When the SMA wires or links within the SMA component 205 reach the contracted configuration, the power is cut off by an appropriately positioned limit switch as discussed above. Next, the return force component 350 exerts the stored return force via the flexible linkage 315 to the SMA component 205 to extend the SMA wires/links in the SMA component 205 to an extended configuration. The application of the return force to the SMA component 205 is controlled by the tailored return force profile adjustment surface 335 of the drive member 310.

The advantageous use of the tailored return force profile adjustment surface 335 will now be described with reference to FIGS. 5A and 5B. One unique aspect of the SMA actuator assemblies of the present invention is the use of tailored force profiles to return the shape memory alloy component 205 to its extended configuration. As will be described below, the numerous embodiments of the tailored return force profile adjustment surface of the present invention may be used to advantage for SMA actuation assemblies that utilize a wide variety of SMA actuation elements, internal mechanical configurations and operate against a variety of external load conditions.

One embodiment of the advantageous use of the tailored return forces of the present invention is illustrated by the tailored return force profile surface 335 of output member 310. As used herein, a tailored force profile refers to the variation in the amount of return force applied to an SMA element as that an SMA element is actuated (i.e., undergoes the cyclical transition between a contracted configuration and an extended configuration). The use of such a tailored return force profile specifically addresses a specific SMA material characteristic and increases the available work envelope, SMA operational efficiency and extends SMA cycle life. Namely, that the force required for the initial extension of an SMA component in a contracted configuration (i.e., when the SMA is still hot but power has been shut off) is less than the force required for the continued extension of that SMA component. It is common that SMA actuator requires increasing extension force as the SMA elements within it are extended. In some applications, the external load may also vary during SMA actuation and such loading variation may also be included into the advantageous tailored return force profile embodiments of the present invention. As a result, the tailored return force profiles described below and utilized in embodiments of the present invention also function as protective mechanisms for the reliable operation of the SMA elements in the various SMA actuator assemblies. Such advantageous operation stands in stark contrast to the operation of conventional constant return force systems. In these conventional systems, a high initial force is applied so that the SMA element may reach the full extended configuration. However, as discussed above, the initial extension operation of a "hot"

SMA does not require as large a force for extension. Thus, conventional return force systems apply an excessive initial return force beyond that needed for initial SMA extension. The application of such excessive return forces may result in damage to the SMA element, diminished SMA component useful life or even catastrophic SMA component failure.

Figure 5A:
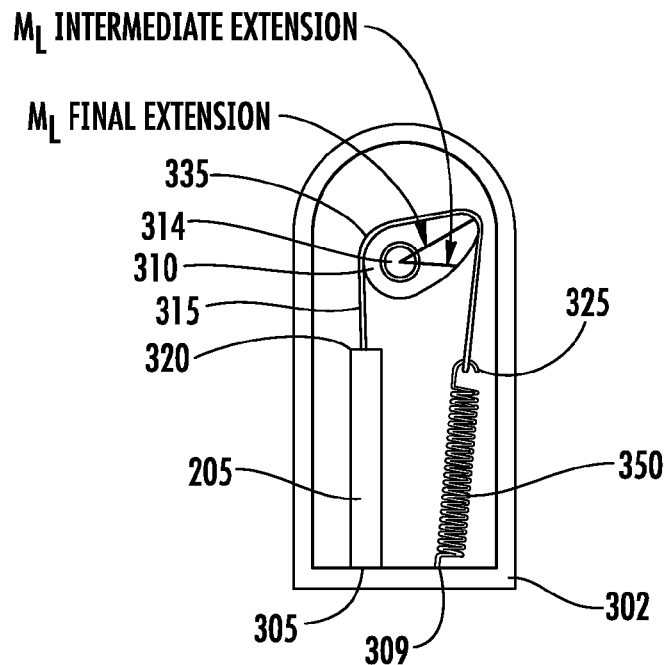
FIG. 5A is a schematic view of the SMA actuator assembly of FIG. 3 in an extended state.
Figure 5B:
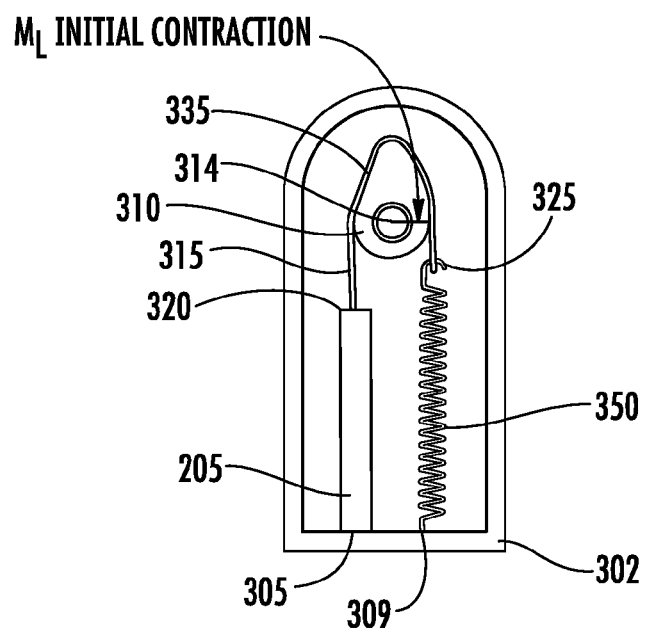
FIG. 5B is a schematic view of the SMA actuator assembly of FIG. 3 in a contracted state.

Turning now to FIG. 5A, which illustrates schematically the components of the shape memory alloy actuator assembly 300 of FIG. 3. Several components of FIG. 3 have been omitted or simplified for clarity. In FIG. 5A, the SMA component 205 is in an extended configuration. Power applied to the SMA component 205 results in contraction of the shape memory alloy elements therein, and the movement of the flexible linkage 315. The movement of the flexible linkage 315 causes rotation of the drive member 310 and the subsequent elongation of the return force component 350. At the end of the SMA activation cycle, by that it is meant that the SMA component 205 has reached its designed contracted configuration, the elements of the SMA actuator assembly 300 are positioned as shown in FIG. 5B. As illustrated in FIG. 5B, the return force component 350 is in its initial, extended state ready to apply the return force to the SMA actuator 205 and return the SMA actuator 205 to its extended configuration (FIG. 5A). The return force stored in the return force component 350 is applied to the SMA component 205 via the flexible linkage 315 across the tailored return force profile adjustment surface 335 of the drive member 310. In the arrangement of the drive member 310 of FIG. 5A this embodiment of a tailored return force profile adjustment surface 335 advantageously provides the highest return force from the return force component 350 to the SMA actuator 205 when the SMA actuator is in the final extended configuration (FIG. 5A). This advantageous arrangement is achieved through the use of a relatively larger moment arm provided by the shape of drive member 310, specifically, the outer contour that forms the tailored return force profile adjustment surface 335. As illustrated, the return force in FIG. 5A is applied across the moment arm having a length $M._L$ final extension, namely, the moment length in the final extended configuration. In contrast, consider how the return force is applied across the tailored return force profile adjustment surface 335 when the drive member has been rotated into the position in FIG. 5B when the SMA component is in final contracted configuration. Here, the return force acts across the much smaller moment arm $M._L$ initial contraction. Thus, a smaller initial return force is generated/applied to the hot, contracted SMA element. An intermediate point having a return force moment arm $M._L$ intermediate extension (i.e., between extension and contraction configurations) is also illustrated in FIG. 5A. The intermediate point is useful in explaining how embodiments of the tailored return force profile adjustment surface 335 of the present invention may be used to adjust the application of the return force. As SMA extension proceeds, the drive member 310 rotates from the position in FIG. 5B, the return force profile will start with a small force (i.e., proportional to the length of the moment arm, here, $M._L$ initial contraction) and end with a large force ($M._L$ final extension) and pass through an intermediate return force level between the initial and final determined by the length of the intermediate moment arm ($M._L$ intermediate extension). It is to be appreciated that the relative lengths of the moment arms in this embodiment are, in increasing order from smallest to largest are, $M._L$ initial contraction, $M._L$ intermediate extension and $M._L$ final extension. In other embodiments, different relative lengths are possible and the order from smallest to largest for $M._L$ initial contraction, $M._L$ intermediate extension and $M._L$ final extension could be different. Thus, embodiments of the present invention advantageously apply various moment arm lengths to tailor the return force profile for a given SMA component or application.

Figure 5C:
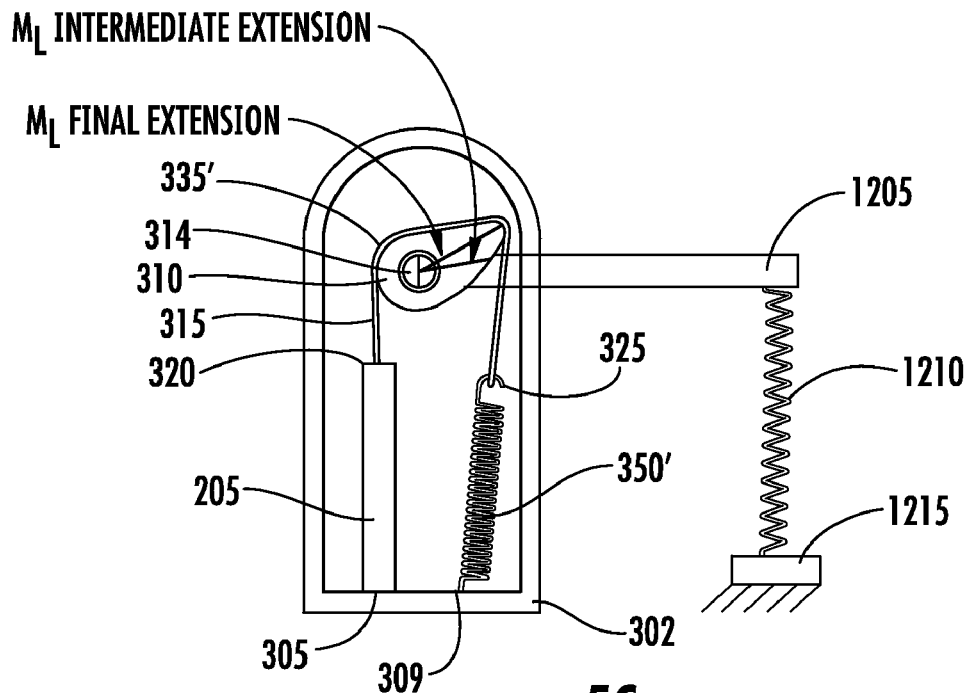
FIGS. 5C through and 5H illustrate alternative embodiments of the return force profile surface of the present invention.
Figure 5D:
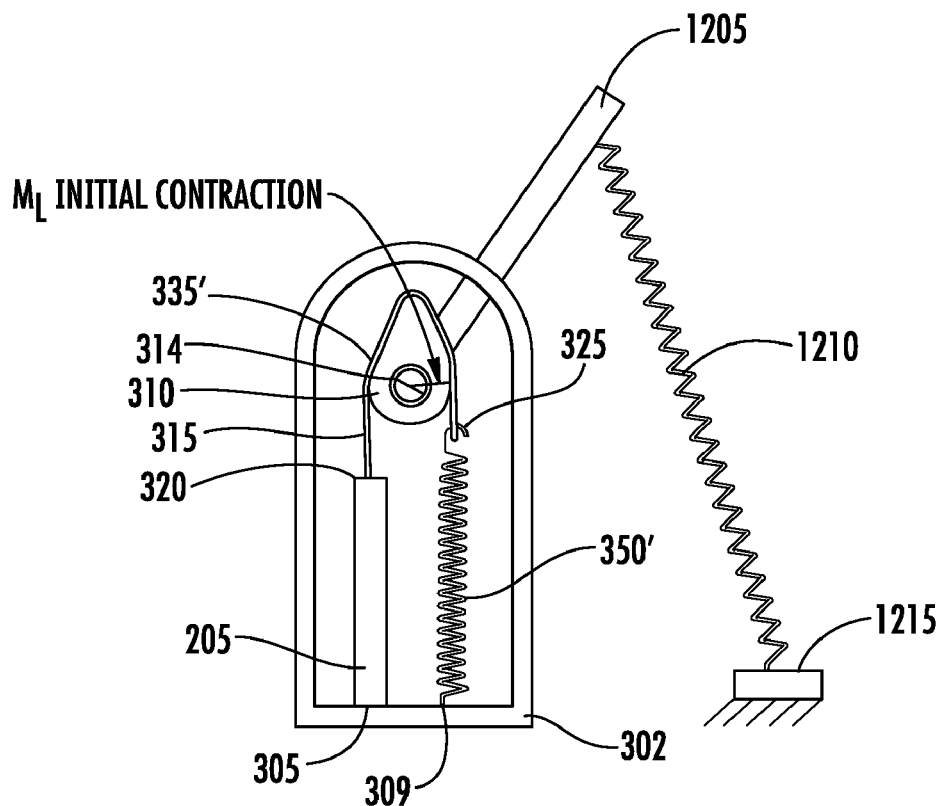
Figure 5E:
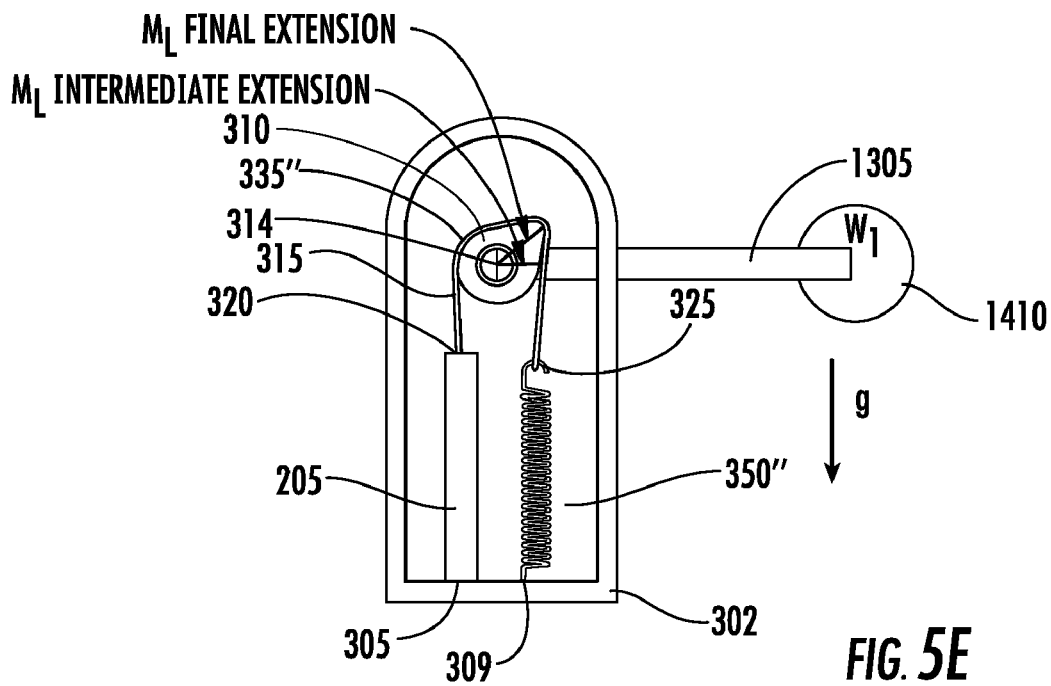
Figure 5F:
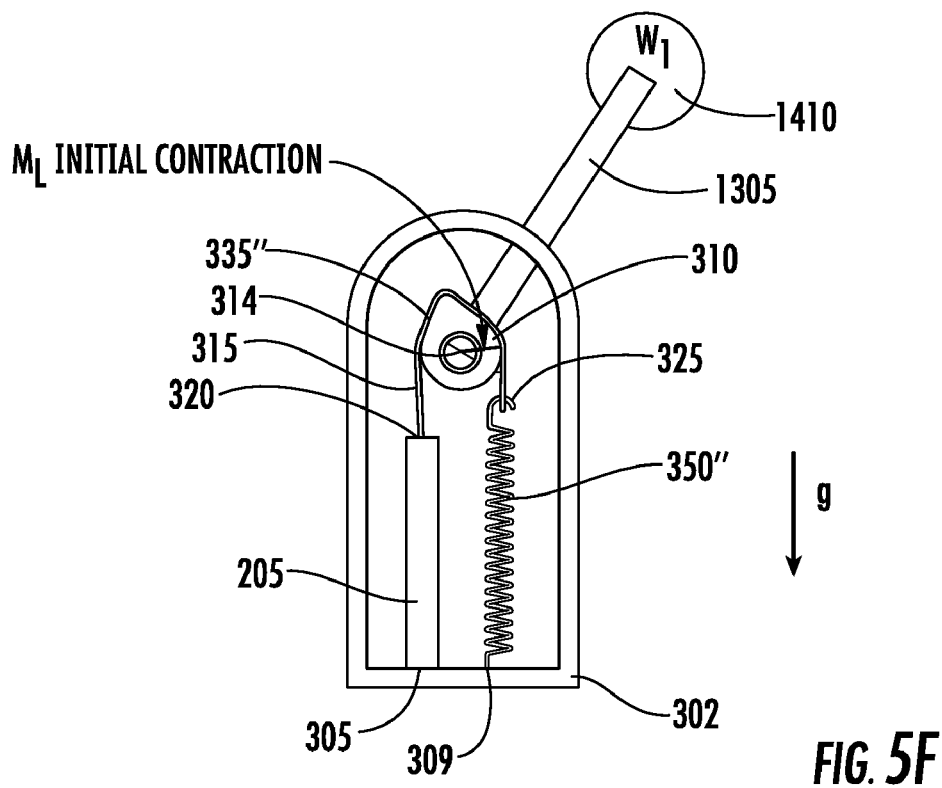
Figure 5G:
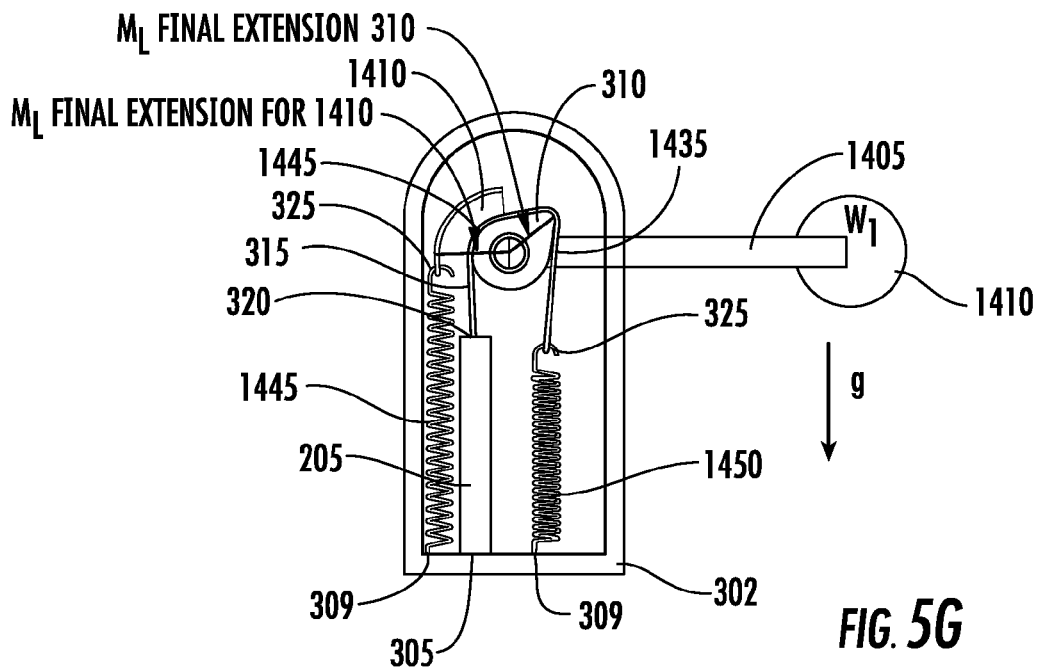
Figure 5H:
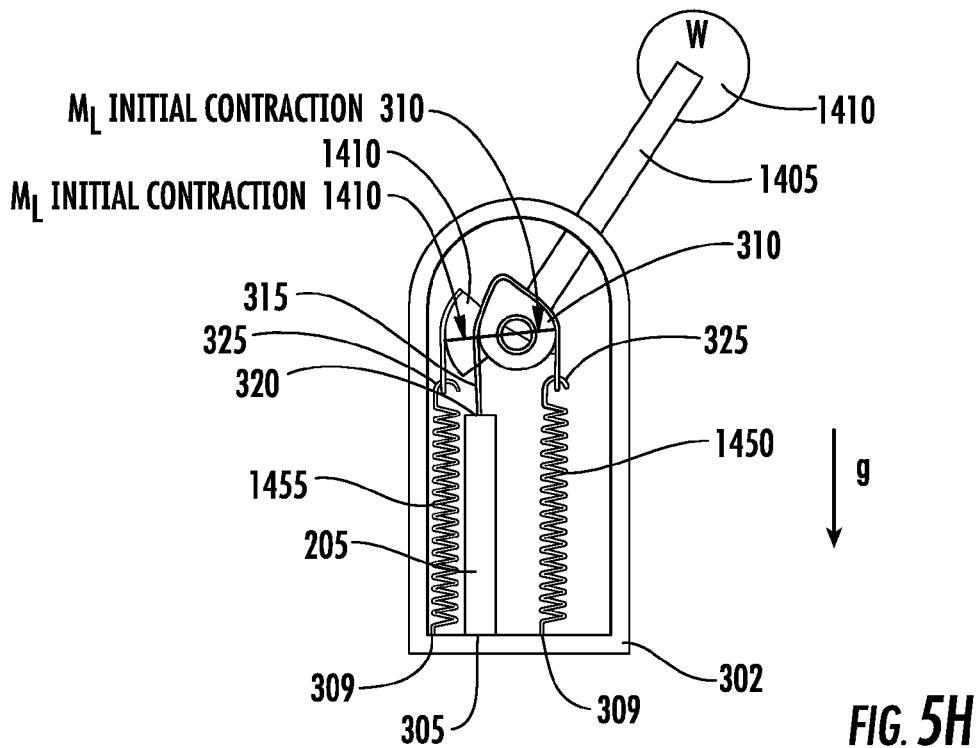

FIGS. 5C through 5H illustrate schematically the components several alternative embodiments of the tailored return force profile adjustment surface 335. Reference numbers and concepts described above with regard to FIGS. 5A and 5B apply to the illustrative examples that follow. The FIGS. 5C through 5H illustrate as well a number of different external loading conditions. FIGS. 5C and 5D illustrate a fixed external load 1215 under spring force 1210. FIGS. 5E and 5F illustrate an external load 1310 of weight W acting at the end of output shaft 1310. FIGS. 5C and 5D illustrate a drive member 310 having an embodiment of the tailored return force profile adjustment surface 335' that is used in conjunction with a return force 350' with an external load 1215 under spring force of spring 1210 acting on output shaft 1205. FIGS. 5E and 5F illustrate a drive member 310 having an embodiment of the tailored return force profile adjustment surface 335" that is used in conjunction with a return force 350" and an external load 1310 of weight W at the end of an output shaft 1305. FIGS. 5G and 5H illustrate a large external load 1410 of weight W1 that is larger than W in FIG. 13. Thus, FIGS. 5G and 5H illustrate where the embodiments of the tailored return force profile adjustment surface of the invention may be used both for tailored SMA return force as well as for assisting in managing the forces generated by large external loads. FIGS. 5G and 5H illustrate two drive member 310 and 1410 having tailored force profile adjustment surfaces 1435 and 1445 respectively.

As illustrated in FIGS. 3, 4, 5A through 5F, the force profile adjustment surface 335 has a tapered appearance further illustrating how embodiments of the present invention may be employed to provide variable return force throughout the extension and contraction strokes of an SMA component. Accordingly, the return force applied to the shape memory alloy component 205 during extension and/or contraction may be adjusted. It is to be appreciated that the shape of the tailored return force profile adjustment surface 335 may be adjusted as needed to specifically tailor the return force profile to the desired return force for a given SMA component. In a preferred embodiment, the tailored return force profile adjustment surface 335 is configured so that the return force is greatest when applied to an SMA component in an extended configuration. In another embodiment, the tailored return force profile adjustment surface 335 is configured so that the return force is smallest when initially applied to an SMA component but then increases as the SMA component is extended. It is to be appreciated that the tailored return force profile adjustment surface 335 results in a wide variety of linear, non-linear and other various return forces being applied to the SMA component 205.

In an alternative embodiment of the tailored return force profile adjustment surface 335, the tailored return force applied to the SMA component by the return force component 350 is lowest when the SMA component 205 is in the contracted configuration than when the SMA component 205 is in the extended configuration. In an alternative embodiment, the tailored return force profile adjustment surface 335 has been advantageously selected such that an increasing return force profile is applied to the SMA component 205 and that return force is smallest when initially applied to a contracted configuration SMA component.

Returning to FIG. 3, other protective mechanisms of the SMA actuator assembly 300 will be described. Two protective mechanisms are illustrated in the embodiment of FIG. 3:

the over-temperature protection mechanism 370 and overstress protection provided by resilient coupling element 330. First, the over-temperature protection mechanism 370 will be described. Any thermally actuated SMA actuator has the potential for overheating and causing catastrophic thermal failure. A thermal fuse for such an actuator can be used to prevent injury, damage, or fire that would otherwise be caused by such a failure. Possible causes of a catastrophic failure are short circuit, electronic control malfunction, or simply applying too much power to the SMA either without overpower protection or failed overpower protection.

Figure 6:
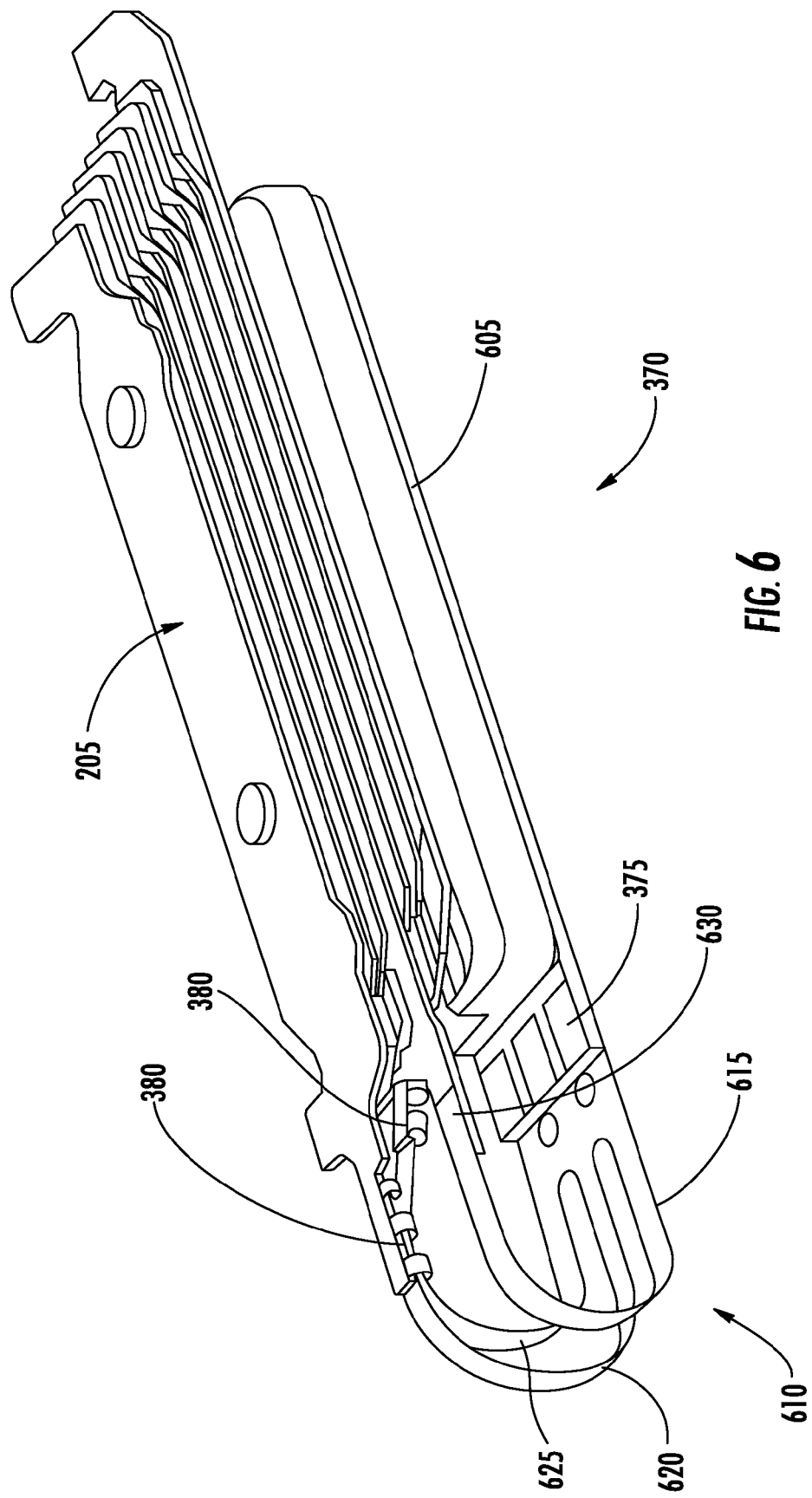
FIG. 6 is an enlarged view of the flexible fuse of the SMA actuator assembly of FIG. 3.

FIG. 6 illustrates the over-temperature protection mechanism 370 in relation to the SMA component 205 disposed on a base 605. The over-temperature protection mechanism 370 includes a flexible printed circuit 610 having three power strips 615, 620 and 625. Power strips 620 and 625 are electrically and mechanically connected to the sliding planes of SMA component 205 via connection points 380. Power strip 615 is connected to the sliding planes of SMA component 205 by a low temperature solder joint 630. Electrical power for the activation of SMA component 205 is provided by a power source (not shown) to the electrical connection points 375. Power then travels through the flexible printed circuit 610 to the three power strips 615, 620 and 625 thence into the SMA component 205 at connection points 380 and 630. In the embodiment illustrated in FIG. 6, the power strip 615 is connected to the SMA component 205 with a solder joint 630. The solder joint 630 is selected to melt when excessive electrical power is applied through power strip 615. Excessive electrical power will vary by application and a wide variety of solder joints 630 may be provided. It is to be appreciated that the flexible printed circuit 610 and the power strips 615, 620 and 625 would, if not attached to the SMA component 205, remain in a flat position in plane with the base 605. Put another way, the flexible printed circuit 610 and the power strips 615, 620 and 625 are biased into and are exerting forces against the attachment points 380 and the solder joint 630. In this embodiment, when an over power condition exists and that condition is severe enough to melt the solder joint 630, the bias force of power strip 615 pulls the power strip 615 out of contact with the SMA component 205. The separation of the power strip 615 from the SMA component 205 prevents further power from being applied to the SMA component 205. Additionally, other electrical switches or indicators (not shown) could also use the "open circuit" condition generated by the separation of power strip 615 to, for example, generate a fault indication. In one embodiment where the SMA component 205 requires protection from over power conditions or other stresses that generate critical temperatures above 100° Celsius, the solder joint 630 would be, for example, a typical eutectic solder alloy comprising about 57% bismuth, 26% indium, and 17% tin. Another advantage of using about 100° C. for a critical temperature is that such a temperature control is also likely to prevent plastic from melting, burning, or smoldering.

In the embodiment described above, the curved implementation or bias of the flexible printed circuit 610 provides the separation force to separate the solder joint 630 when the critical temperature is reached and the low temperature joint melts. It is to be appreciated that other low temperature solder compositions are possible and that other joining methods other than soldering may be used and are within the scope of the present invention. Additionally, other separation forces may be used instead of the bias applied by flexible printed circuit 610. For example, other separation forces may be mechanical separation caused by a spring or other suitably positioned elastic material that pulls on the joint but only breaks when the joint melts. It is to be appreciated that the advantageous use of a sacrificial joint, such as solder joint 630, protects the SMA actuator assembly but is also easy to replace. In addition, repair and replacement of the solder joint 630, or other similar sacrificial thermal fuse is less complicated and less expensive than the resulting cost and complexity of replacing other more valuable elements of the SMA actuator assembly such as, for example, an SMA component.

Another protective feature in SMA actuator assembly 300 is the overstress protection mechanism provided by resilient coupling element 330 (FIGS. 3 and 4). Similar to spring clip 120 described above, resilient coupling element 330 is used to rigidly connect the drive member 310 to the output member 312 for a desired range of force. If the range of force is exceeded, then the drive member 310 and output member 312 are allowed to deflect from their fixed positions. As a result, the excessive force is transferred into the resilient coupling element 330. By transferring the excessive force into the resilient coupling element 330, damage to the shape memory alloy component 205 is prevented. The resilient coupling component 330 is advantageously configured to prevent external forces applied to the output shaft 314 from being transferred into the linkages of the SMA assembly 300 (FIG. 4). By absorbing any excess forces, the resilient coupling element 330 decreases likelihood of damage to either the mechanical linkages of SMA actuator assembly 300 or the SMA component 205. In addition, other protective features described above with regard to FIG. 2 and SMA actuator assembly 200 may also be employed by the SMA actuator assembly 300.

Figure 7:
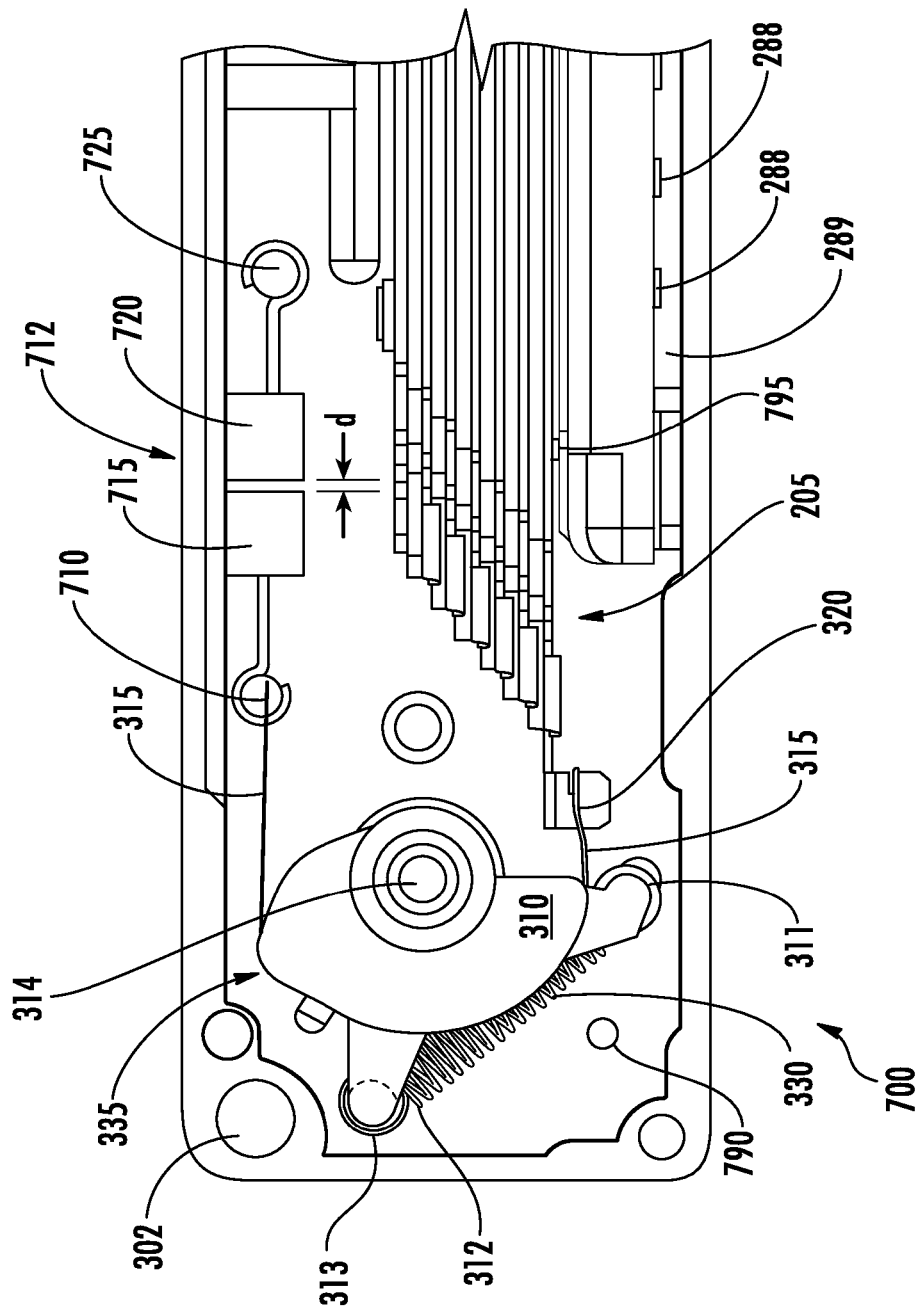
FIG. 7 is another alternative embodiment of an SMA actuator assembly of the present invention having a magnetically actuated return force component.

FIG. 7 illustrates another alternative embodiment of a SMA actuator assembly according to the present invention. The SMA actuator assembly 700 includes similar components and protective features, such as SMA component 205, drive member 310, output member 312, printed circuit board 289 and other components that are configured and operate as described above with regard to SMA actuator assembly 300. The SMA assembly 700 differs mainly in the return force mechanism utilized by the return force component. Here, the return force is provided by magnetic actuation. The return force component 712 includes a magnet 715 and a ferrous coupling 720. The magnet 715 is connected to the flexible linkage 315 by a suitable coupling 710. The ferrous coupling 720 is attached to the casing 302 by a suitable attachment point 725. In this embodiment, a tailored return force (i.e., a return force profile of a regressive nature) may be provided by the advantageous arrangement of the magnet 715 and a ferrous coupling 720. In this embodiment, the magnetic attractive force between the magnet 715 and the ferrous coupling 720 decreases proportionately to one over the separation distance ("d") between them squared ($1/d^2$). As a result, this embodiment represents additional return force profile adjustment in addition to the force profile adjustment capabilities described above with regard to the tailored return force profile adjustment surface 335 of the drive member 310 (FIGS. 4, 5A and 5B).

Two protective features are illustrated in FIG. 7 that may also be applied to all other SMA actuator assembly embodiments described herein. First, a endstop pin 795 is positioned within the SMA actuator 205 and adjacent the sliding plane with the greatest horizontal displacement at the point of greatest horizontal displacement. Contact between the endstop pin 795 and the sliding plane acts as an endstop and an overstress protection mechanism. Similarly, an endstop feature 790 is position in the pathway traveled by the output member 310. As the output member 310 rotates, the distal end (near attachment point 313) moves towards the feature 790. The feature 790 has been positioned at the appropriate position relative to the motion of the drive member 313 to also act as an overstress or motion limitation mechanism and protect the SMA actuator assembly 700. While described with regard to the specific embodiment of FIG. 7, these features may be used with other SMA actuator assemblies describes herein.

Figure 8:
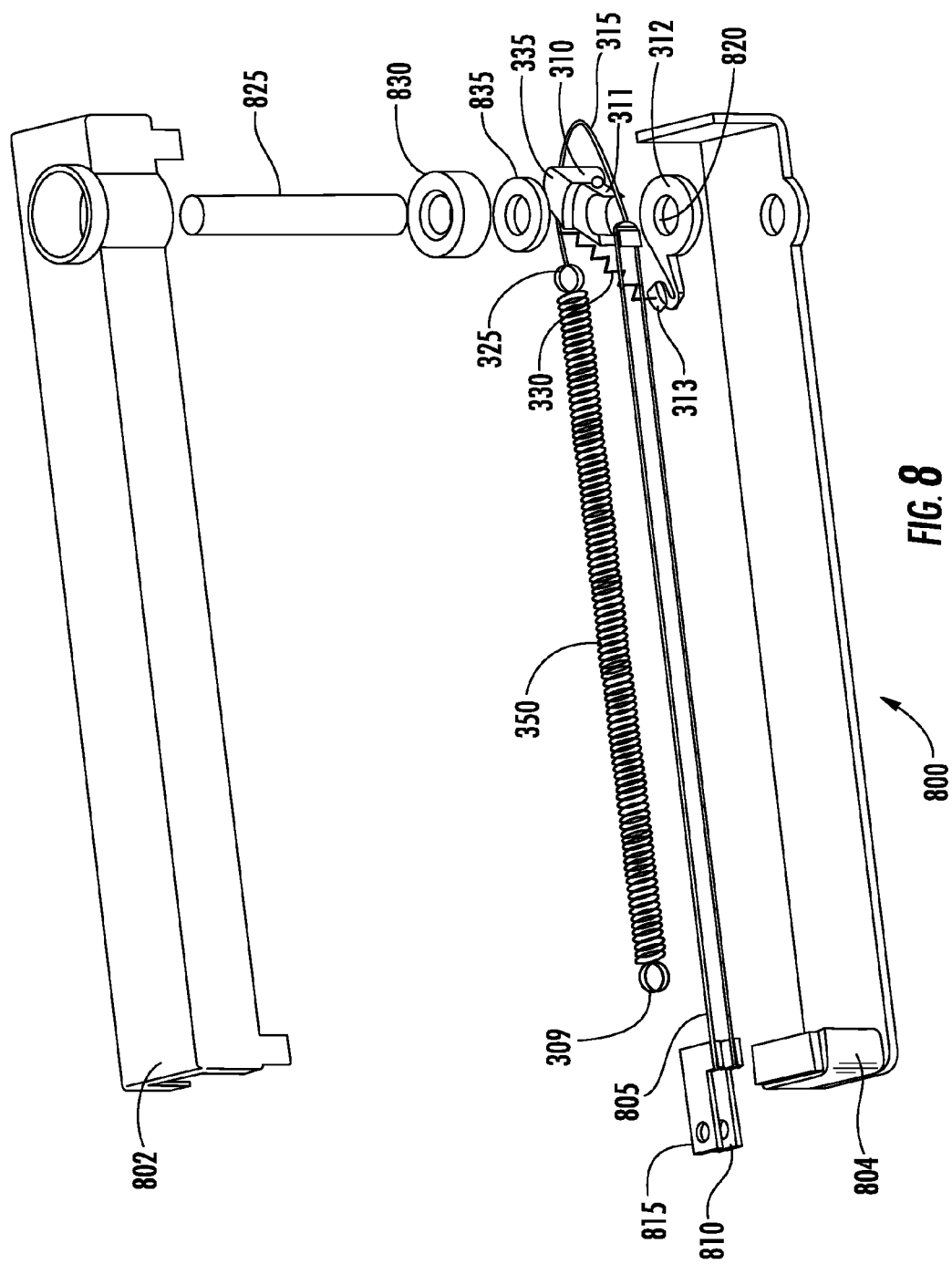
FIG. 8 is an exploded view of an alternative embodiment of an SMA actuator assembly according to the present invention having a rotating output.

FIG. 8 illustrates another alternative embodiment of an SMA actuator assembly according to the present invention. The SMA actuator assembly 800 is illustrated in an exploded view. The SMA actuator assembly 800 differs from earlier described embodiments in that a single strand of SMA wire 805 is used to provide the activation force for rotational movement of the output shaft 825. The mechanical linkage and operation of the drive member 310, 312, flexible linkage 315, and return force component 350 are described above with regard to the other embodiments and their operation remains the same here. The shape memory alloy wire 805 is connected to the casing 804 by suitable connection points 810 and 815. The SMA wire 805 is run from connection point 810 to an attachment point 313 on the output member 312 and then returned to another attachment point 815 on the casing. The double strand or out and back configuration of the SMA wire 805 illustrated in FIG. 8 results in a higher force generated when power is applied to the SMA wire 805. As described above with regard to FIG. 4, the drive member 310 and output member 312 are resiliently coupled by spring 330. In operation, the contraction of the SMA wire 805 results in the deflection of the connection point 820 towards the attachment points 810 and 815. The deflection of the attachment point 820 results in the rotation of the output shaft 825 and the extension of the return force member 350. As above, the output shaft 825 is fixedly connected to the output member 312 and is in a slideable relation to the drive member 310. Contraction force generated by the SMA wire 805 is transmitted from the drive member 310 to the output shaft 825 because of the fixed position provided by resilient coupling component 330. As described above, the resilient coupling force of the coupling member 330 is selected to provide force transmission from the SMA wire to the output shaft 825 over a given force range. If however, an external force is applied to the output shaft 825 it would be absorbed by the resilient coupling component 330 thereby preventing damage to the internal components of SMA actuator assembly 800, especially the shape memory alloy wire 805. Other protective mechanism, while not illustrated in FIG. 8, may also be utilized in other embodiments of the SMA actuator assembly 800.

Electrical power is applied to SMA wire connection points 815 and 810 resulting in the contraction of SMA wire 805. As SMA wire 805 contracts, the contraction force acting through attachment point 820 results in the deflection of both drive member 310 and output member 312, transmitted by the flexible linkage 315, to cause rotation to output shaft 825 and extension of the return force component 350. When the maximum SMA contraction state is reached, power to the SMA wire 805 is shut off through the use of appropriately positioned limit switches described above but not illustrated in FIG. 8. Once power is shut off from the SMA wire 805, the return force stored in return force component 350 acts to reverse the above-described motion. Namely, the return force component 350 exerts, via the flexible linkage 315, the return force across the return force tailored return force profile adjustment surface 335 of the drive member 310 resulting in the opposite rotation of the output shaft 825 and the extension of the SMA wire 805.

FIGS. 9A through 9D illustrate additional alternative embodiments of SMA actuator assemblies of the present invention. More particularly, FIGS. 9A through 9D will be used to described an alternative embodiment of a resilient coupling element 905 and an alternative embodiment of a resilient coupling element 990. The SMA actuator assemblies illustrated in FIGS. 9A and 9B have been simplified, and components omitted for clarity. It is to be appreciated that the operational details, protective features and various alternatives described above with the other embodiments of the SMA actuator assemblies of the present invention may also be applied to the SMA actuator assemblies 900 and 950. Similarly, the advantages of the alternative embodiments described below with regard to the SMA actuator assemblies 900 and 950 may be applied to the other embodiments of the SMA actuator assemblies of the present invention described above.

Figure 9A:
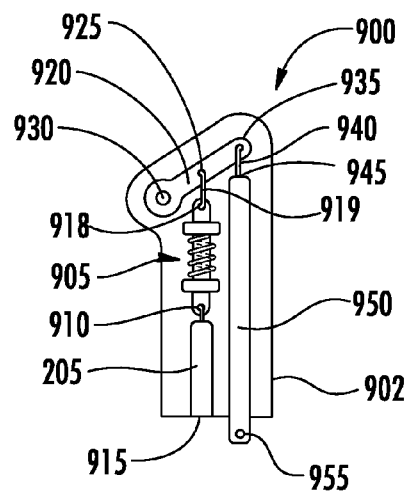
FIGS. 9A through 9D illustrate several configurations of an alternative embodiment of a resilient coupling element according to the present invention.

FIG. 9A illustrates an embodiment of an SMA actuator assembly 900 according to the present invention. The SMA actuator assembly 900 includes a shape memory alloy component 205, a resilient coupling member 905, a drive member 920, and an output linkage 950 within a casing 902. The shape memory alloy component 205 is attached to the return force component 905 at attachment point 910 and is fixed within the casing 902 at attachment point 915. The resilient coupling element 905 is attached to the drive linkage 920 at attachment point 925. In operation, the contraction of SMA component 205 causes the output member 920 to deflect about pivot point 930 resulting in the linear actuation of output member 950.

Figure 9B:
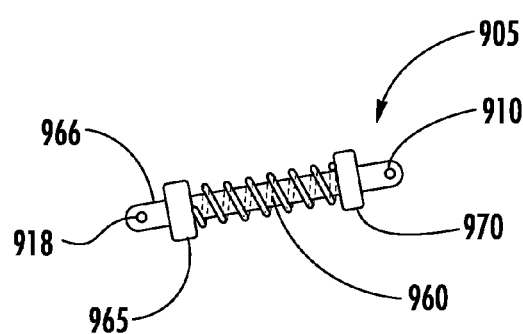

The advantageous operation of the resilient coupling member 905 as a protective mechanism will now be described with regard to FIG. 9B. The resilient coupling element 905 includes a shaft 966 with a resilient member 960 disposed between attachment members 965 and 970. One or the other of attachment members 965 and 970 is attached to the shaft 966 with the other left in slideable relation to the shaft 966. As illustrated in FIG. 9B, attachment member 965 is rigidly attached to shaft 966 while attachment member 970 is in slideable relation to shaft 966 but is rigidly attached to the output portion of the SMA component 205. The coupling element 960 is selected to apply an appropriate resilient coupling force between the attachment members 965 and 970 holding them in a fixed spatial relation so long as the forces applied to them do not exceed a given design force. The concept involved in this resilient coupling element 905 are similar to the concepts described above with regard to resilient coupling element 330. By that it is meant that the resilient coupling element 960 will remain fixed over a given range of force but will deflect if the range of force is exceeded. Consider a condition where the intended range of force has been exceeded. The attachment member 970 will deflect along shaft 966, thereby preventing the excessive force from being transmitted into the internal components of the SMA component 205.

Figure 9C:
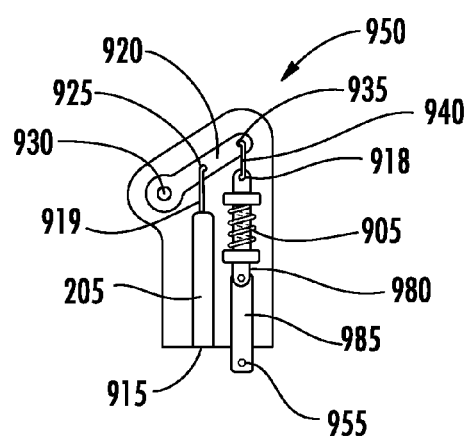

An alternative embodiment of an SMA actuator assembly according to the present invention is illustrated in FIG. 9C. The embodiment of the SMA actuator assembly 950 is similar in every regard to the SMA actuator assembly 900 except for the placement of the resilient coupling element 905. In the embodiment illustrated in FIG. 9C, the resilient coupling element 905 is positioned between the drive member 920 and the output shaft 985.

Figure 9D:
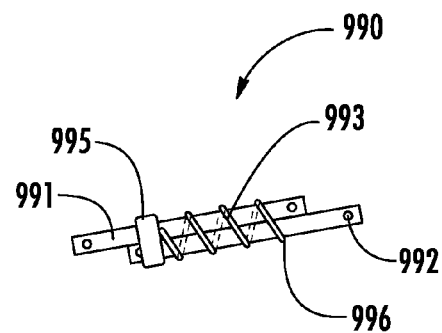

FIG. 9D illustrates an alternative embodiment of the resilient coupling member 905. The resilient coupling element 990 includes a first shaft 991 and a second shaft 992 and a coupling element 993. The coupling element 992 is fixedly connected to the shaft 991 at connection point 995. The connection point 995 while fixedly attached to the shaft 991 is in a slideable relation to the shaft 992. The resilient coupling element 993 is fixedly attached to the shaft 992 at the attachment point 996. The resilient coupling member 990 may be used as illustrated in FIGS. 9A and 9C as described for resilient coupling element 905. Like the resilient coupling element 960 of resilient coupling component 905, the resilient coupling element 993 is advantageously selected to keep the output shaft in operation, the resilient coupling element 993 applies a resilient coupling force to maintain shaft 991 and shaft 992 in a fixed relation. The shafts 991 and shaft 992 will remain in fixed relation and effectively transmit the forces applied to them as long as the force remains within a designed criteria. If, however, the force applied to either shaft 991 or shaft 992 exceeds the allowed design force then the shaft 992 will deflect relative to shaft 991 as the excessive force is absorbed by and results in the deflection of the resilient coupling element 993.

Figure 10A:
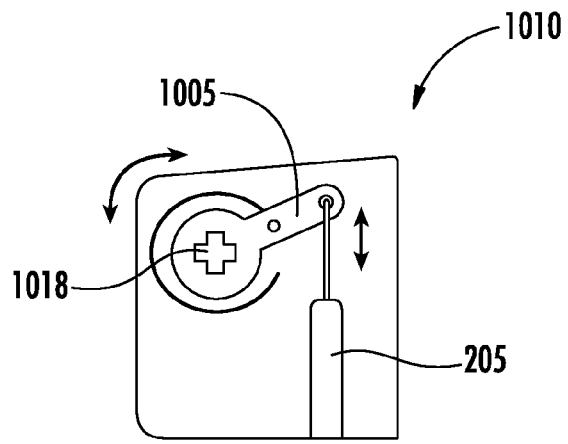
FIGS. 10A, 10B and 10C illustrate alternative embodiments of the output configurations of the SMA actuator assemblies of the present invention.
Figure 10B:
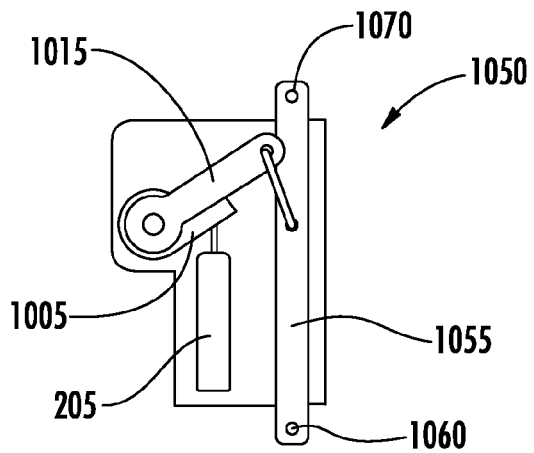
Figure 10C:
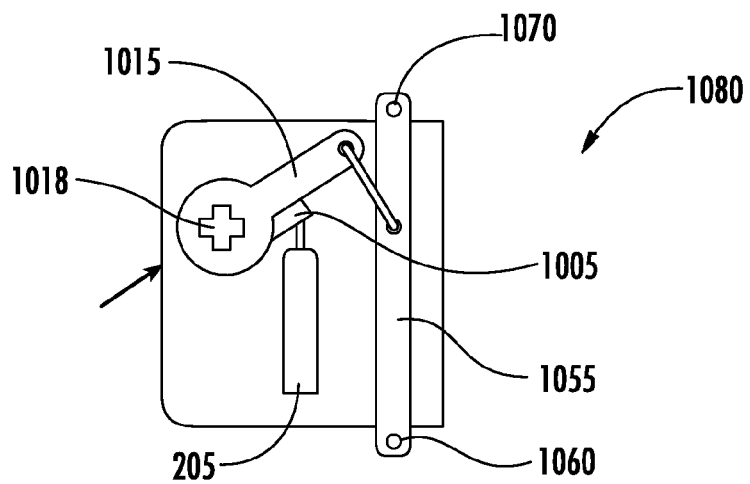

FIGS. 10A, 10B and 10C illustrate additional output configurations for SMA assemblies according to the present invention. The SMA actuator assemblies 1010, 1015 and 1080 are provided for illustrative purposes to describe alternative output configurations. For simplicity and clarity, additional specific mechanical workings, protective features and other details of the SMA actuator assemblies of the invention described above have been omitted. It is to be appreciated, however, that the additional mechanical elements, protective features etc. described above for the other embodiments of the SMA actuator assemblies of the present invention are included in the SMA actuator assemblies 1010, 1015 and 1080. Similarly, the alternative output configurations described herein may also be applied freely to the other embodiments of the SMA actuator assemblies of the present invention.

FIG. 10A illustrates a rotational output shape memory alloy actuator assembly 1010. In this embodiment, a shape memory alloy component 205 is coupled to a drive member 1005 whereby the contraction force generated by the SMA component 205 results in the deflection of the drive member 1005 and the rotation of the output shaft 1018. FIG. 10B illustrates the SMA actuator assembly 1050 configured to provide a push-pull linear output. An SMA component 205 is coupled to a drive member 1005 and an output member 1015 as described above with regard to the drive member 110 and the output member 112. (FIGS. 1A and 2). The drive member 1015 is fixedly attached to the output shaft 1055. The output shaft 1055 has two attachment points, 1060 and 1070, that may be attached to external loads. In operation, the actuation forces generated by the SMA component 205 result in up and down deflection of the output shaft 1055 and the two attachment points, 1060 and 1070.

Turning now to FIG. 10C, the SMA actuator assembly 1080 provides a combined linear push pull output as well as a rotational output. The SMA actuator assembly 1080 combines the rotational output 1018 of SMA actuator assembly 1010 with the push pull actuation mechanism of SMA actuation assembly 1050. Thus, actuation forces generated by SMA component 205 result in rotation of output spline or shaft 1018 as well as linear (i.e., push-pull) movement of output shaft 1055. The linear movement of output shaft 1055 may be coupled to external loads through attachment to external attachment points 1070 and 1060.

Figure 11A:
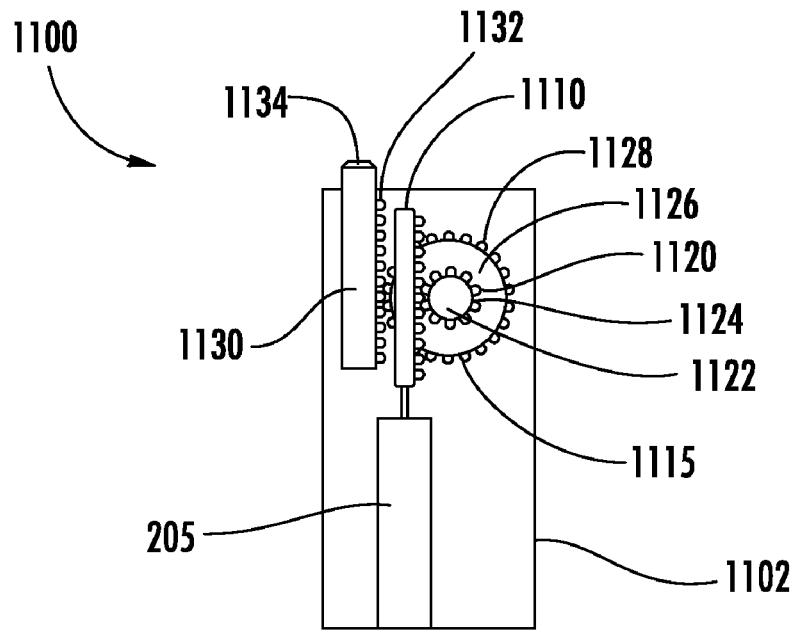
FIGS. 11A and 11B illustrate alternative embodiments of the stroke multiplying mechanisms of the present invention.
Figure 11B:
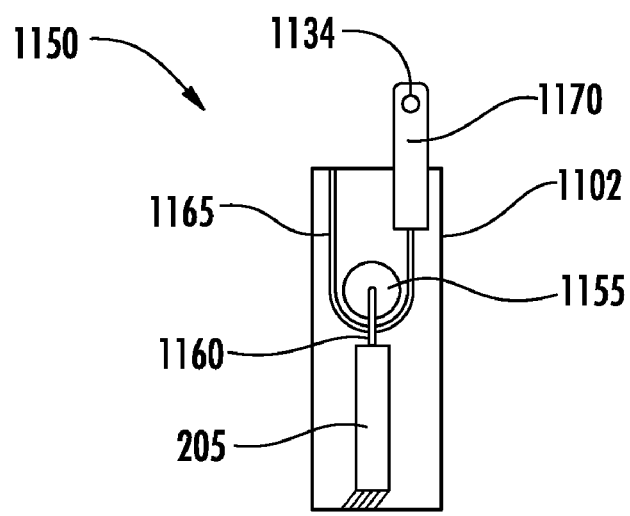

Stroke output multipliers of the present invention will be described through reference to FIGS. 11A and 11B. FIGS. 11A and 11B illustrate SMA actuator assemblies 1100 and 1150. The SMA actuator assemblies 1100 and 1150 are provided for illustrative purposes to describe alternative stroke output multiplier configurations. For simplicity and clarity, additional specific mechanical workings, protective features and other details of the SMA actuator assemblies of the invention described above have been omitted. It is to be appreciated, however, that the additional mechanical elements, protective features etc. described above for the other embodiments of the SMA actuator assemblies of the present invention are included in the SMA actuator assemblies 1100 and 1150. Similarly, the alternative stroke output multiplier configurations described herein may also be applied freely to the other embodiments of the SMA actuator assemblies of the present invention.

FIG. 11A illustrates an embodiment of a double rack and pinion stroke output multiplier. SMA actuator assembly 1100 includes an SMA component 205, a drive member 1110, a double pinion 1120 and output shaft 1130. The cooperative operation of the drive member 1110 double pinion 1120 and output shaft 1150 are conventional rack and pinion operation as understood by those of ordinary skill in the art. Briefly, actuation forces generated by SMA elements within the SMA component 205 are transmitted to drive member 1110. Drive member 1110 has an arrangement of teeth 1115 that are shaped, pitched, and arranged to engage with the teeth 1124 on small pinion 1122 of the double pinion 1120. Movement of the drive member 1110 results in rotation of small pinion 1122 and a subsequent rotation of the large pinion 1126. Large pinion teeth 1128 have been shaped, pitched, and arranged to cooperatively engage with the output shaft teeth 1132 to transmit the force into output shaft member 1130. Those of ordinary skill in the art will appreciate that a wide variety of conventional rack and pinion configurations including various teeth sizes and various sizes of the small pinion 1122 and large pinion 1126 may be employed advantageously in accordance with the present invention. As a result, the actuation forces generated by the SMA component 205 are effectively multiplied and transmitted to the output shaft 1130 and to external components via the external connection point 1134.

FIG. 11B illustrates an SMA actuator 1150 that employs a pulley stroke multiplier assembly. The SMA actuator assembly 1150 includes an SMA component 205, a pulley 1155, a linkage 1160, a flexible member 1165 and an output shaft 1170 within a casing 1102. In operation, actuation forces generated within SMA component 205 are transmitted via the rigid linkage 1160 to the pulley 1155. The forces generated against the pulley 1155 in turn operate to deflect the flexible linkage 1165 thereby producing movement of the output shaft 1170. The dimensions and arrangement of the flexible linkage 1165, rigid linkage 1160, and the pulley 155 may all be adjusted as is well known in the art to provide the desired stroke multiplication. As a result, actuation forces generated by the SMA component 205 are multiplied and transmitted to output shaft 1170 and are available for application to external components via attachment point 1134. Various well known combinations and variations in the size and arrangement of the pulley 1155, flexible linkage 1165 and the coupling 1160 may be used to increase the force output or stroke multiplication generated by the SMA component 205.

The foregoing exemplary descriptions and the illustrative preferred embodiments of the present invention have been explained in the drawings and described in detail, with varying modifications and alternative embodiments being taught. It is to be appreciated that various aspects of a particular SMA actuator assembly described with regard to one particular configuration may have equal applicability to other SMA actuator assembly embodiments. For example, a protective mechanism described with regard to one particular embodiment may be equally as applicable to and used in other embodiments. By way of another example, the output force and stroke multiplying features described above with regard to FIGS. 11A and 11B may be used with any of the disclosed embodiments and others that may occur to those of ordinary skill in the art. While aspects of the invention have been shown, described and illustrated, it is to be appreciated by those skilled in the art that equivalent changes in form and detail may be made therein without departing from the true spirit and scope of the invention, and that the scope of the present invention is to be limited only by the claims that follow.

ADDITIONAL DISCLOSURE

A first aspect of the invention relates to the design of the return spring and its interfaces, and its bending compliance and electrical function. As shown in FIGS. 12A and 12B, the relatively long extension spring is able to follow the contour of a cam surface when the actuator approaches the end of its contraction stroke. In one embodiment, the shape and position of the cam together with the linear extension characteristics of the extension spring contribute to a force versus angle profile which is amenable to adjustment. In particular, for best device longevity, it is convenient to have the return mechanism (spring and cam) force profile nearly match the force profile associated with the extension portion of the SMA cycle (except for an amount needed for handling the external payload). In FIG. 12A, the cam tip is near the beginning of the stroke, while in FIG. 12B it is near the end.

A first aspect of the invention relates to the design of the return spring and its interfaces. As shown in FIG. 12A-12B, the relatively long extension spring is able to follow the contour of a cam surface when the actuator approaches the end of its contraction stroke. In one embodiment, the shape and position of the cam together with the linear extension characteristics of the extension spring contribute to a force versus angle profile which is amenable to adjustment. In particular, for best device longevity, it is convenient to have the return mechanism (spring and cam) force profile nearly match the force profile associate with the extension portion of the SMA cycle (except for an amount needed for handling the external payload).

Figure 14:
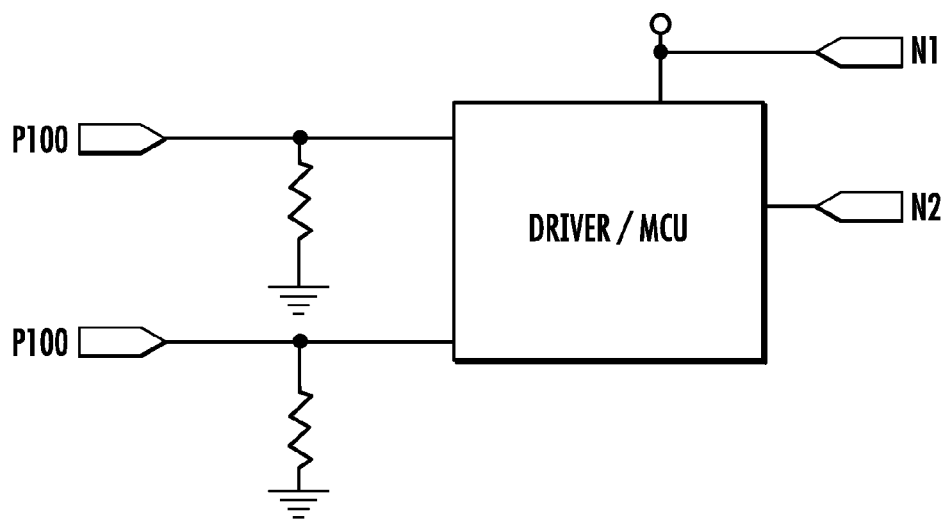
FIG. 14 illustrates connectors to the actuator drive/controller.

In addition to its mechanical role, the return spring participates in the electrical control of the actuator. As indicated schematically in FIG. 13, one end of the spring is held at a supply potential presented to terminal N1. The other end of the spring which rides on the end of the cam can make one of two electrical connections to terminals labeled P0 and P100. These terminals provide to the external driver circuit logical signals corresponding to the fully extended and fully contracted SMA, respectively, as further illustrated in FIG. 14. Base on the state of these signals and any user commands, the N2 terminal will be switched between potential levels either the same as N1 or sufficiently different so as to adequately power the SMA. Depending on the value of N1, the resistors in FIG. 14 may have either a pull-up or pull-down effect.

Figure 15:
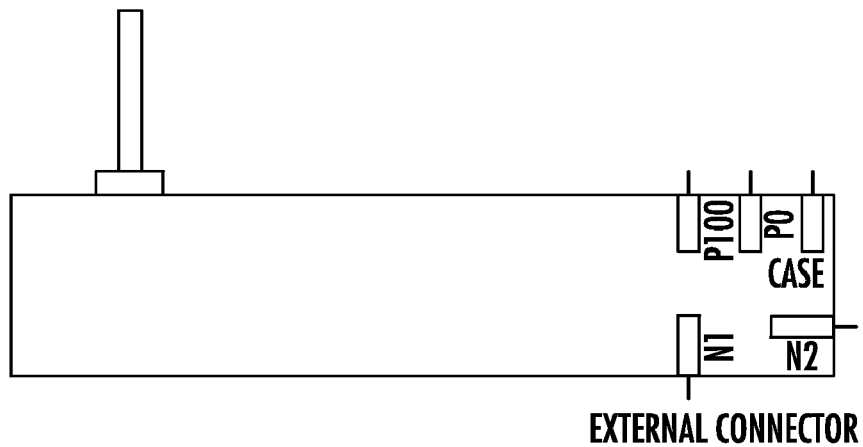
FIG. 15 illustrates exemplary locations of electrical terminals on an actuator case.

Exemplary locations for the various terminals discussed above are shown in FIG. 15. In addition to the terminals discussed so far, FIG. 15 also shows a terminal labeled "Case". If the actuator case is conductive, this terminal may be used to simplify some internal connections. For instance, it may be possible to join N1 to the case, particularly if the case is to be grounded or shielded from user's hands. The ability to choose either a grounded or live case has consequences on the type of electronic components to be employed in the driver. For instance, choosing N1 to have a positive supply voltage, requires N2 to be switched between the supply voltage and ground, a condition referred to as low-side drive. The switching can be performed by using an n-channel transistor or like device in the driver. Conversely, a grounded N1 implies a high-side drive, which can require p-channel SMOS, bipolar pnp switching or the like. Such flexibility may be beneficial in achieving a low cost product.

Among the advantages attending this aspect of the invention is the provision of end-of-travel logical indications without any additional components.

A second aspect of the present invention relates to the configuration of a parallel wall heat sink. The use of heat sinking walls which control the extracted heat rate by adjustment of the distance between source and sink is well known. In the case of the SMA actuators using thin wires, controlling proximity from a single wall to sufficient accuracy is relatively difficult.

Figure 16:
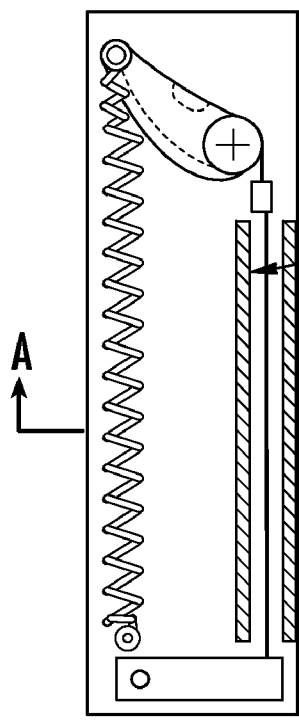
FIG. 16 illustrates a plan view of an actuator with parallel wall heat sink.
Figure 17:
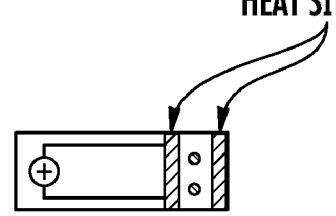
FIG. 17 illustrates a cross section along line A-A in FIG. 16.

As shown in FIGS. 16 and 17, in one embodiment, the present invention provides a heat sinking means which largely overcomes this difficulty by means of using a parallel pair of heat sinking walls. This configuration inherently compensates for nearer spacing to one of the walls by a greater distance to the other wall. The result is a four-fold improvement (loosening) of proximity tolerance.

A third aspect of the invention teaches techniques for improved SMA crimping for providing a tolerant actuator assembly. The use of crimps to join SMA wire to other system components is well established in the prior art. It is also known that to manage the amount of pseudo elastic (recoverable) strain for maximum reliability, it is necessary to carefully control the initial length of SMA wire at a known load. Unfortunately for that prior art approach, the low effective elastic modulus of the low temperature SMA phase (the martensite) results in a rather large variance of the initial wire strain when the load is allowed to vary within reasonable limits. When exacerbated by other system variations, such a strain variance may result in reduced product reliability or yield. To overcome that limitation in the existing art, various embodiments of the present invention use two exemplary techniques:

(a) rearranging the process sequence so as to have most components already in place when the SMA wire is assembled. This way, when the SMA is crimped in place, all non SMA-related length variations have already taken their value, and the SMA crimp location is able to compensate for them.

(b) Carrying out actuator assembly while the wire is predominantly in a high temperature phase (the austenite). As such temperatures, the effective modulus of the SMA is much higher which leads to significantly reduced initial strain variability and a more consistent product. In practice, this can be executed, for example, by ohmic heating of the SMA at a pre-determined safe power level while the work cell is held within a controlled temperature range. The assembly fixture can be designed with electrical probes capable of bringing the electrical power to the SMA in situ without endangering other electrical components.

To achieve the inventive benefits, the above techniques may be practice separately or jointly.

Figure 18:
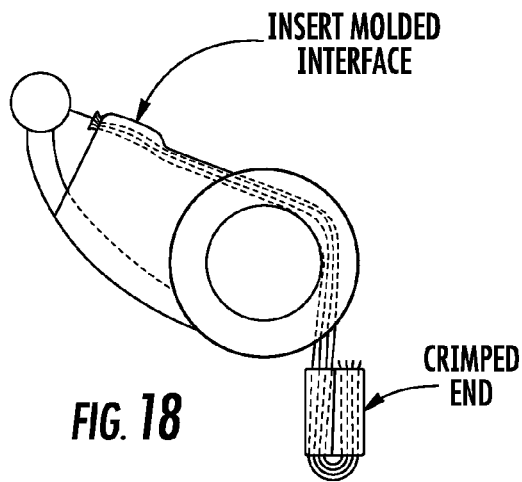
FIG. 18 illustrates an end view of an insert-molded and crimped flexible link interface.
Figure 19:
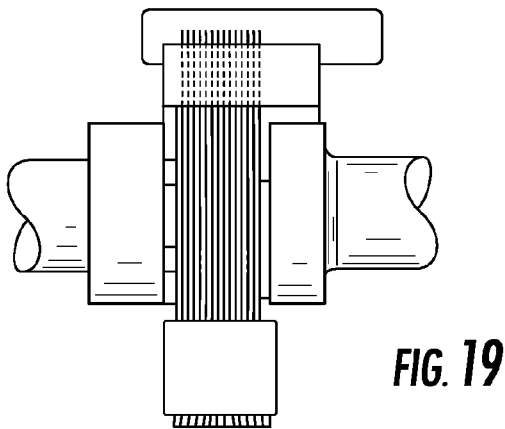
FIG. 19 illustrates a side view of the interface of FIG. 19.

A number of ways are known in the art to interface shape memory alloy (SMA) wires with various mechanisms such as pulleys and cams. To prevent its premature failure due to excessive bending, an SMA wire is sometimes interfaced with a mechanism via an intermediate flexible link usually made of a more tolerant material, such a another wire, a braided cable, etc. The fourth aspect of the present invention teaches an improved method of interfacing the SMA wire to the mechanism. According to this method, the flexible link (which can consist of a durable fibrous material) is crimped in a U-shaped loop at one end (see FIGS. 18 and 19) and is assembled to the driven member by insert molding the other end. The SMA wire loop may be conveniently captured in the crook of the U-shape, resulting in a reliable joint. The overall effect is to produce a highly reliable, yet low cost interface.

Figure 20A:
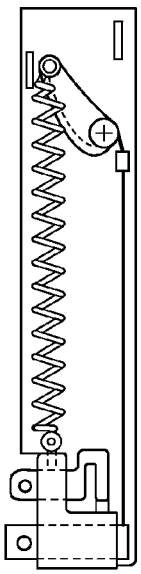
FIGS. 20A, 20B, and 20C illustrate front, side and end views of an actuator with insert molded parts.
Figure 20B:
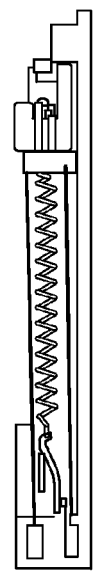
Figure 20C:
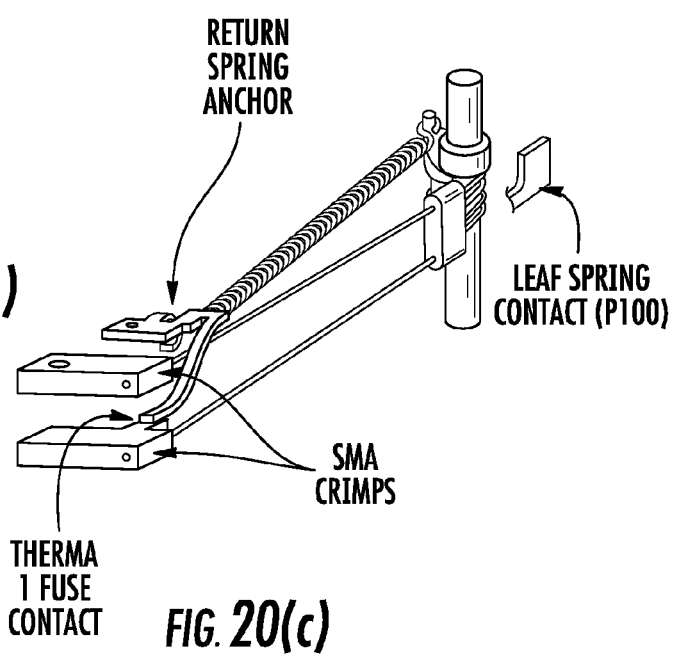

In a fifth aspect the invention discloses a method of providing several of the actuator functions with a simplified, multi-purpose subsystem which may be manufactured in a single insert-molding step. As illustrated in FIGS. 20A-20C, the subsystem according to this aspect of the invention provides leaf spring contacts, SMA crimps, a thermal fuse contact, and a return spring anchor all assembled in a single step. The benefits of this method include accurate relative placement of all the components as well as reduced manufacturing cost.

Figure 21:
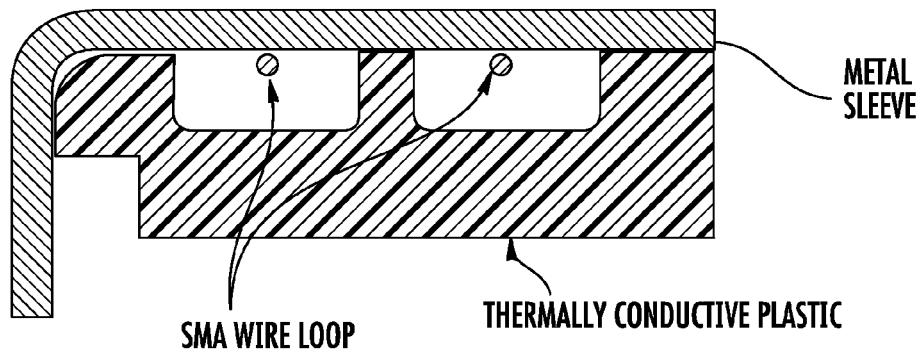
FIG. 21 illustrates a cross section of a parallel wall heat sink.

A further improvement of the parallel wall heat sink (described above) is now depicted by reference to FIG. 21. In this cross sectional view, the two legs of the SMA wire loop (see, e.g. FIGS. 20A-20C) are revealed as two dark spots cradled by narrow channels formed in a thermally conductive plastic body. The latter, in turn, is proximally located to a locally flat metal heat sink doubling as metal sleeve housing. In a specific embodiment, the plastic body is in thermal content with the metal sleeve. This arrangement benefits from a greater tolerance to wire position offset in a direction perpendicular to the metal sleeve wall. Similar benefits accrue with respect to the other two walls of the channel, namely enhanced proximity cooling, as well as lateral positional tolerance. The proximity cooling enhancement from the side walls of the channel comes about in two distinct ways: (a) direct line-of-sight radiative and thermal-diffusive heat transfer (the convective component is probably suppressed by viscosity effects in these narrow channels) between the wire and the wall, and (b) indirect conduction of heat from the adjacent plastic wall to the metal sleeve.

Various embodiments of the present invention are best practiced using a thermally conductive plastic material which is electrically insulating. This will prevent the occurrence of a potentially damaging short circuit in the unlikely event that the SMA wire touches the plastic.

Figure 22:
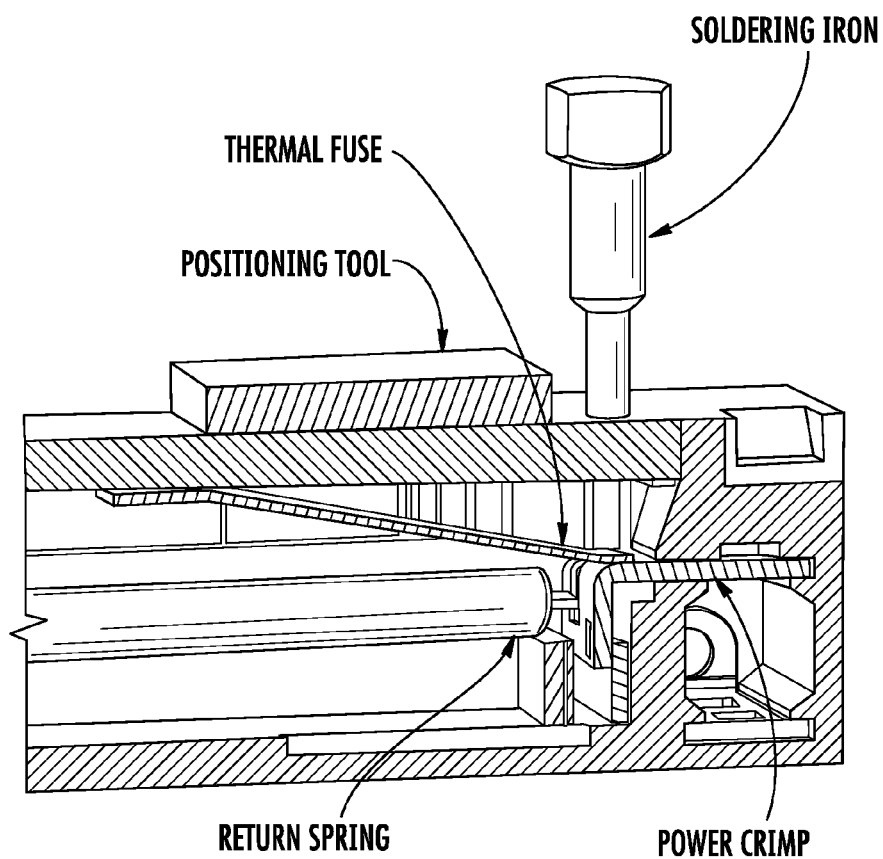
FIG. 22 illustrates a cut-away view showing installation of a thermal fuse into an actuator.

The use of a thermal fuse was previously disclosed in the related U.S. patent application Ser. No. 10/431,173 and further refined in U.S. patent application Ser. No. 60/529,002. FIG. 22 illustrates a further exemplary over-temperature (thermal fuse) protection mechanism in the process of being installed into the actuator of one embodiment of the present invention. FIG. 22 shows (in cut-away form) the portion of the actuator in the immediate vicinity of the thermal fuse. It also shows a positioning tool deployed so as to bring one end of a leaf spring into mechanical contact with a power crimp (illustrated in FIG. 22). That end of the leaf spring carries a deposit of suitable solder material.

Figure 23:
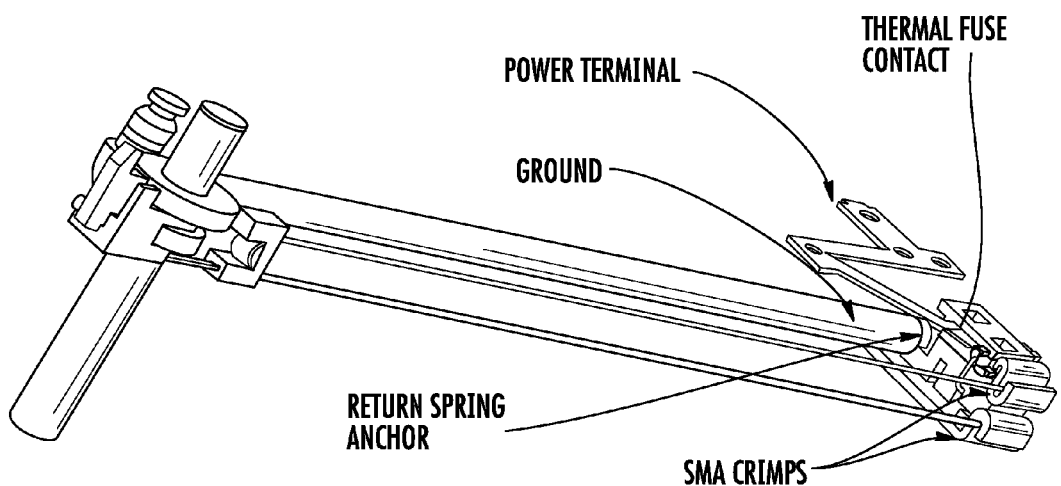
FIG. 23 illustrates a simplified view of an actuator with a thermal fuse.

FIG. 22 also shows a thin soldering iron tip reaching into the interior space of the actuator through an access hole. The tip is preheated to a temperature compatible with the selection of solder material mentioned above. The distance of the thermal fuse from the access hole is chosen so as to enable the soldering iron tip to reach it in order to cause the solder to re-flow and create a mechanical and electrical connection between the resilient contact and the power crimp. It should be noted that when the positioning tool deflects the resilient contact, a mechanical bias is put in place which will remain frozen into the thermal fuse until it is released by an over-temperature condition. By design, the melting (or softening) temperature of the solder becomes the maximum allowed temperature for the device. Anytime the temperature exceeds that maximum, an over-temperature condition exists. Since numerous solder formulations are known in the art, it is possible to tailor the maximum allowed temperature in accordance with the requirements of the application. FIG. 23 shows a simplified view of an actuator with a thermal fuse in an assembled form.

Although the over-temperature condition may arise for various reasons, the most important one is over-power. Electrical power for the activation of SMA wire is provided by a power source (not shown) through the fusible link described above. In this embodiment, when an over power condition exists and that condition is severe enough to melt the solder joint, the bias force of the resilient contact opens the circuit, thus allowing the SMA wire and its surroundings to cool off. The separation of the resilient contact from SMA power crimp terminal prevents further power from being applied to the SMA component. Additionally, other electrical switches or indicators (not shown) could also use the "open circuit" condition generated by the activation of the thermal fuse, for example, to generate a fault indication. In one embodiment where the SMA wire requires protection from over-power conditions or other stresses that generate critical temperatures above 100° Celsius, the solder joint would be, for example, a typical eutectic solder alloy comprising about 57% bismuth, 26% indium, and 17% tin. Another advantage of using about 100° C. for a critical temperature is that such a temperature control is also likely to prevent plastic from melting, burning, or smoldering.

The use of the present inventive assembly method is superior compared to the normal method of first soldering the contact, and then closing the actuator package. By allowing the actuator package to be closed and secured before assembling the thermal fuse, tighter tolerances may be maintained over the length and preload level of the SMA component. The tighter tolerances, in turn, permit a more reliable and durable device to be produced. This is because the mechanical disturbances associated with the biasing of the contact spring as well as the melting and subsequent solidification of the low temperature solder are not permitted to affect the SMA wire, crimps, and other components secured by the actuator lid (package).

We claim:

1. A shape memory alloy actuator assembly comprising:
   a shape memory alloy component;
   an output shaft coupled to the shape memory alloy component such that contraction of the shape memory alloy component causes output shaft movement;
   two parallel heat sink members extending along opposite sides of the shape memory alloy component configured to control rate of extraction of heat from the shape memory alloy component;
   a return force component coupled to the shape memory alloy component to move the shape memory allow component from a contracted configuration to an extended configuration said return force component providing a tailored return force to the shape memory alloy component; and
   a protective mechanism to prevent damage to the shape memory alloy component.

2. An actuator assembly according to claim 1 wherein the shape memory alloy component is a shape memory alloy wire.

3. An actuator assembly according to claim 1 wherein the shape memory alloy component comprises a set of stacked parallel conductive plates having shape memory alloy links connecting adjacent plates.

4. An actuator assembly according to claim 1 wherein said output shaft movement is linear.

5. An actuator assembly according to claim 1 wherein said output shaft movement is rotational.

6. An actuator assembly according to claim 1 wherein said output shaft movement is a combination of linear movement and non-continuous rotary movement.

7. An actuator assembly according to claim 1 wherein the tailored return force applied to the shape memory component by the return force component is smallest when the shape memory component is in a contracted configuration.

8. An actuator assembly according to claim 1 wherein the tailored return force applied to the shape memory component by the return force component is higher when the shape memory component is in the extended configuration than when the shape memory component is in the contracted configuration.

9. An actuator assembly according to claim 1 wherein the tailored return force applied to the shape memory component by the return force component is smallest when the tailored return force is initially applied to the shape memory alloy component.

10. An actuator assembly according to claim 1 wherein the protective mechanism is selected from the group consisting of: an electrical shut off switch, a thermal fuse, a mechanical end stop and an electrical end stop.

11. An actuator assembly according to claim 1 wherein the return force is provided applied across the outer surface of the drive member.

12. An actuator assembly according to claim 11 wherein the outer surface of the drive member further comprises a shaped surface that defines the force profile of the return force.

13. A shape memory alloy actuator assembly, comprising:
a shape memory alloy component;
a drive member coupled to the shape memory alloy component;
two parallel heat sink members extending along opposite sides of the shape memory alloy component configured to control rate of extraction of heat from the shape memory alloy component;
an output shaft;
an output member coupled to the output shaft;
a resilient coupling element having a fixed condition and a deflected condition wherein when the resilient coupling element is in the fixed condition, the output member and the drive member are urged into cooperative movement to transmit the thermoelastic movement of the shape memory alloy component to the output shaft and when the resilient coupling element is in a deflected condition the output member and the drive member are allowed to move relative to one another; and
a protective mechanism positioned within the shape memory alloy actuator assembly to prevent damage to the shape memory alloy component.

14. A shape memory alloy actuator assembly according to claim 13 wherein the resilient coupling element is a spring clip.

15. A shape memory alloy actuator assembly according to claim 13 wherein the resilient coupling element is a combination compression, torsion spring and the output member and drive member are arranged in a split lever configuration.

16. A shape memory alloy actuator assembly according to claim 13 wherein the resilient coupling element is a pre-tensioned spring, the drive member and the output member are in a split lever configuration, and the pre-tensioned spring connects the distal end of the drive member to the distal end of the output member.

17. A shape memory alloy actuator assembly according to claim 13 wherein the shape memory alloy component is a shape memory alloy wire.

18. A shape memory alloy actuator assembly according to claim 13 wherein the shape memory alloy component is a set of stacked parallel conductive plates having shape memory alloy links connecting adjacent plates.

19. A shape memory alloy actuator assembly according to claim 1 further comprising a stroke output multiplier coupled to the shape memory alloy component.

20. A shape memory alloy actuator according to claim 19 wherein said stroke output multiplier is a pulley linkage system disposed between the shape memory alloy component and the output shaft.

21. A shape memory alloy actuator according to claim 19 wherein said stroke output multiplier is a double rack and pinion system disposed between the shape memory alloy component and the output shaft.

22. A shape memory alloy actuator assembly according to claim 13 further comprising a stroke output multiplier coupled to the shape memory alloy component.

23. A shape memory alloy actuator according to claim 22 wherein said stroke output multiplier is a pulley linkage system disposed between the shape memory alloy component and the output shaft.

24. A shape memory alloy actuator according to claim 21 wherein said stroke output multiplier is a double rack and pinion system disposed between the shape memory alloy component and the output shaft.

25. An actuator assembly according to claim 13 further comprising a return force component coupled to the shape memory alloy component to move the shape memory allow component from a contracted configuration to an extended configuration, said return force component providing a tailored return force to the shape memory alloy component.

26. An actuator assembly according to claim 25 wherein the return force is provided applied across the outer surface of the drive member.

27. An actuator assembly according to claim 26 wherein the outer surface of the drive member comprises a shaped surface that defines the force profile of the return force.

* * * * *